United States Patent
Chong et al.

(10) Patent No.: US 8,886,535 B2
(45) Date of Patent: Nov. 11, 2014

(54) UTILIZING MULTIPLE PROCESSING UNITS FOR RAPID TRAINING OF HIDDEN MARKOV MODELS

(71) Applicant: Accumente, LLC, Sunnyvale, CA (US)

(72) Inventors: Jike Chong, Sunnyvale, CA (US); Ian Richard Lane, Sunnyvale, CA (US); Senaka Wimal Buthpitiya, Mountain View, CA (US)

(73) Assignee: Accumente, LLC, Sunnyvale, CA (US)

( * ) Notice: Subject to any disclaimer, the term of this patent is extended or adjusted under 35 U.S.C. 154(b) by 0 days.

(21) Appl. No.: 14/162,415

(22) Filed: Jan. 23, 2014

(65) Prior Publication Data

US 2014/0142942 A1    May 22, 2014

Related U.S. Application Data

(63) Continuation of application No. PCT/US2012/000527, filed on Aug. 28, 2012.

(60) Provisional application No. 61/575,809, filed on Aug. 29, 2011.

(51) Int. Cl.
*G10L 15/00* (2013.01)
*G10L 15/14* (2006.01)
*G10L 15/06* (2013.01)

(52) U.S. Cl.
CPC ............. *G10L 15/063* (2013.01); *G10L 15/144* (2013.01)
USPC ...... 704/243; 704/7; 704/8; 704/10; 704/244; 704/245

(58) Field of Classification Search
CPC .... G10L 15/187; G10L 15/148; G10L 15/197
USPC ......................................... 704/7–10, 243–245
See application file for complete search history.

(56) References Cited

U.S. PATENT DOCUMENTS

| | | | |
|---|---|---|---|
| 5,621,859 A * | 4/1997 | Schwartz et al. ............. | 704/256 |
| 5,729,656 A * | 3/1998 | Nahamoo et al. ............. | 704/254 |
| 6,711,541 B1 * | 3/2004 | Kuhn et al. ................... | 704/242 |

(Continued)

OTHER PUBLICATIONS

Buthpitiya, S., et al., "Rapid training of acoustic models using graphics processing units," Department of Electrical and Computer Engineering, Carnegie Mellon University, Aug. 29, 2011.

(Continued)

*Primary Examiner* — Leonard Saint Cyr
(74) *Attorney, Agent, or Firm* — Beyer Law Group LLP

(57) ABSTRACT

A method of optimizing the calculation of matching scores between phone states and acoustic frames across a matrix of an expected progression of phone states aligned with an observed progression of acoustic frames within an utterance is provided. The matrix has a plurality of cells associated with a characteristic acoustic frame and a characteristic phone state. A first set and second set of cells that meet a threshold probability of matching a first phone state or a second phone state, respectively, are determined. The phone states are stored on a local cache of a first core and a second core, respectively. The first and second sets of cells are also provided to the first core and second core, respectively. Further, matching scores of each characteristic state and characteristic observation of each cell of the first set of cells and of the second set of cells are calculated.

19 Claims, 18 Drawing Sheets

(56) References Cited

U.S. PATENT DOCUMENTS

| | | | |
|---|---|---|---|
| 8,639,510 B1* | 1/2014 | Yu et al. | 704/256.6 |
| 2003/0200085 A1 | 10/2003 | Nguyen et al. | |
| 2004/0122671 A1* | 6/2004 | Lam et al. | 704/254 |
| 2004/0176956 A1 | 9/2004 | Rockenbeck et al. | |
| 2006/0116877 A1* | 6/2006 | Pickering et al. | 704/231 |
| 2008/0255839 A1 | 10/2008 | Larri et al. | |
| 2011/0145184 A1 | 6/2011 | You et al. | |

OTHER PUBLICATIONS

Rabiner, L., "A tutorial on hidden Markov models and selected applications in speech recognition," Proceedings of the IEEE, vol. 77, No. 2, pp. 257-286, Feb. 1989.

Pepper, D. et al., "Using a ring parallel processor for hidden Markov model training," IEEE Transactions on Acoustics, Speech and Signal Processing, vol. 38, No. 2, pp. 366-369, Feb. 1990.

Yun, H. K., et al., "Speech recognition HMM training on reconfigurable parallel processor," The 5th Annual IEEE Symposium on FPGAs for Custom Computing Machines, pp. 242-243, Apr. 1997.

Popescu, V. et al., "Parallel training algorithms for continuous speech recognition, implemented in a message passing framework," The 14th European Signal Proc. Conf. (EUSIPCO'06), Florence, Italy, Sep. 4-8, 2006.

Nickolls, J., et al., "Scalable parallel programming with CUDA," ACM Queue, vol. 6, pp. 40-53, Mar. 2008.

You, K., et al., "Parallel scalability in speech recognition," IEEE Signal Processing Magazine, vol. 26, No. 6, pp. 124-135, Nov. 2009.

Liu, C., "cuHMM: a CUDA implementation of hidden Markov model training and classification," http://code.google.com/p/chmm, May 2009.

Dixon, P. R. et al., "Harnessing graphics processors for the fast computation of acoustic likelihoods in speech recognition," IEEE International Conference on Acoustics, Speech and Signal Processing, pp. 4321-4324, Jul. 18, 2008.

Pangborn, A. D., "Scalable data clustering using GPUs," Master's thesis, Rochester Institute of Technology, Rochester, NY, May 2010.

Woodland, P. C. et al., "The 1994 HTK large vocabulary speech recognition system," Proc. of ICASSP 95, pp. 73-76, May 1995.

International Search Report in corresponding PCT Appln. No. PCT/US2012/052709, mailed Feb. 6, 2013.

Written Opinion in corresponding PCT Appln. No. PCT/US2012/052709, mailed Feb. 6, 2013.

* cited by examiner

UTILIZING MULTIPLE PROCESSING UNITS FOR RAPID TRAINING OF HIDDEN MARKOV MODELS

CROSS-REFERENCE TO RELATED APPLICATIONS

The present application is a continuation of PCT international patent application PCT/US2012/052709, filed Aug. 28, 2012, which claims priority to U.S. provisional patent application 61/575,809, filed Aug. 29, 2011, both of which are hereby incorporated by reference in their entirety.

FIELD OF THE INVENTION

The present invention relates to improvements to increase the efficiency of the training of Hidden Markov Models for speech recognition and related applications. In particular, parallel computing is used to increase the number of observations that may be processed in a given time period.

BACKGROUND OF THE INVENTION

Robust and accurate speech recognition systems today can only be realized with adequately trained acoustic models. State-of-the-art systems are now trained using thousands of hours of speech data. However, the entire training process can take many weeks. Although existing training techniques that utilize Hidden Markov Models work well in training speech recognition models, there are on-going efforts to further improve the efficiency of such training.

There have been a number of efforts over the past decades to reduce the time required to train Hidden Markov Models for speech recognition. In 1990, Pepper et al. experimented with performing training on a set of computers organized in a ring. In 1992, Foote et al. introduced an approach to distribute Hidden Markov Model training to a set of five loosely-coupled Armstrong II multi-processor network computers. In 1997, Yun et al. mapped the training algorithm to a field-programmable gate array infrastructure. And in 2006, Poprescu et al. implemented acoustic model training on a message passing interface-based cluster with three nodes. These prior works all achieved less than 3× speedup over sequential runs and thus have not been widely used.

In a separate field, Liu implemented training of discrete Hidden Markov Models on graphics processing units. In particular, Liu developed the implementation to be effective for applications such as biological sequence analysis. This generic training engine, however, is not appropriate for acoustic model training as it 1) is unable to handle continuous observation models, and 2) cannot take advantage of the special left-right model structure used in speech recognition. Further, in Dixon et al., techniques for fast acoustic likelihood computation were introduced in the context of a speech recognition decoder, but did not extend the work to the training process. Additionally, Pangborn constructed an efficient implementation on the graphics processing unit for flow cytometry used in biology and immunology, but this approach only trains a single Gaussian mixture model and is thus unsuitable for acoustic model training.

SUMMARY

In one aspect, a method of optimizing the calculation of matching scores between phone states and acoustic frames across a matrix of an expected progression of phone states aligned with an observed progression of acoustic frames within an utterance is described. The matrix has a plurality of cells, each cell associated with a characteristic acoustic frame and a characteristic phone state. The method comprises determining a first set of cells within a first row, the first row associated with a first phone state of the progression of phone states. Each cell of the first set of cells meets a threshold probability of matching the first phone state. The method also comprises determining a second set of cells within a second row, the second row associated with a second phone state of the progression of phone states. Each cell of the second set of cells meets a threshold probability of matching the second phone state. Additionally, the method comprises storing, on a local cache of a first core, the first phone state. The method also comprises storing, on a local cache of a second core, the second phone state. The method also comprises providing, to the first core, the first set of cells and providing, to the second core, the second set of cells. Further, the method comprises calculating, on the first core, matching scores of each characteristic state and characteristic observation of each cell of the first set of cells. Additionally, the method comprises calculating, on the second core, matching scores of each characteristic state and characteristic observation of each cell of the second set of cells.

In another embodiment of the present invention, a method of optimizing the calculation of matching scores between phone states and acoustic frames across a matrix of an expected progression of phone states aligned with an observed progression of acoustic frames within an utterance is described. The matrix has a plurality of cells, each cell associated with a characteristic acoustic frame and a characteristic phone state. The method comprises determining a first set of cells within a first row, the first row associated with a first phone state of the progression of phone states. Each cell of the first set of cells meets a threshold probability of matching the first phone state. The method also comprises determining a second set of cells within a second row, the second row associated with a second phone state of the progression of phone states. Each cell of the second set of cells meets a threshold probability of matching the second phone state. Additionally, the method comprises distributing storage of each phone state of the progression of phone states across a plurality of local caches on a chip. The method also comprises providing, to a first core, the first set of cells associated with a first phone state that matches the phone state that is stored on the local cache that is associated with the first core, and providing, to the second core, the second set of cells associated with a second phone state that matches the phone state that is stored on the local cache that is associated with the second core. Further, the method comprises calculating, on the first core, matching scores of each characteristic state and characteristic observation of each cell of the first set of cells. Additionally, the method comprises calculating, on the second core, matching scores of each characteristic state and characteristic observation of each cell of the second set of cells.

In a further embodiment of the present invention, a method of optimizing the calculation of matching scores between phone states and acoustic frames across a matrix of an expected progression of phone states aligned with an observed progression of acoustic frames within an utterance is described. The matrix has a plurality of cells, each cell associated with a characteristic acoustic frame and a characteristic phone state. The method comprises determining a first set of cells within a first row, the first row associated with a first phone state of the progression of phone states. Each cell of the first set of cells meets a threshold probability of matching the first phone state. The method also comprises storing, on a first core, the first phone state of the progression of phone states. Additionally, the method comprises scheduling the calculation of matching scores of each cell of a first set of cells on the first core, where each cell of the first set of cells is associated with the first phone state. Further, the method comprises calculating, on the first core, matching scores of each characteristic state and characteristic observation of each cell of the first set of cells.

These and other features of the present invention will be described in more details below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

In one embodiment.

In another embodiment, FIG. 15 illustrates a flow chart of a method of determining a path across a matrix comprising a plurality of cells, each cell having a characteristic state and a characteristic observation, where the path demonstrates a best alignment of an expected progression of states and an observed progression of observations, in accordance with embodiments of the present invention.

In one embodiment.

In another embodiment, FIG. 16 illustrates another flow chart of a method of determining a path across a matrix comprising a plurality of cells, each cell having a characteristic state and a characteristic observation, where the path demonstrates a best alignment of an expected progression of states and an observed progression of observations, in accordance with embodiments of the present invention.

In one embodiment.

In another embodiment.

DETAILED DESCRIPTION OF THE PREFERRED EMBODIMENTS

Figure 1:
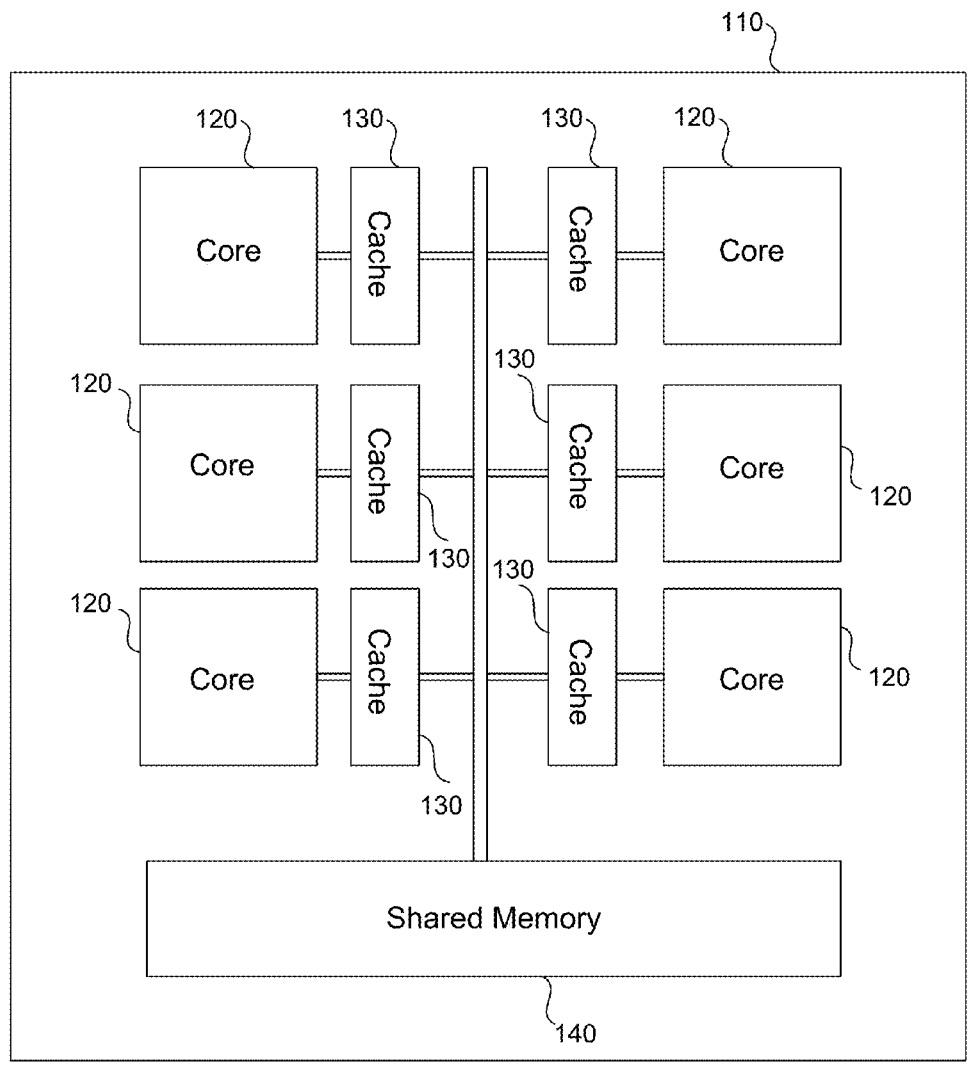
FIG. 1 illustrates a parallel computing architecture, in accordance with embodiments of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Improvements to increase the efficiency of the training of Hidden Markov Models for speech recognition and related applications are described herein. In particular, embodiments discussed may increase the efficiency of the training of acoustic models for speech recognition applications. For example, embodiments discussed may increase the efficiency of the training of acoustic models suitable for automatic speech recognition, speaker identification, acoustic identification, voice biometrics identification, music transcription, music copyright protection, and content identification. Accordingly, for automatic speech recognition, parallel computing may be used to increase the number of utterances that may be processed in a given time period.

Additionally, embodiments discussed may also be used to increase the efficiency of other applications that utilize Hidden Markov Models, such as hand-writing recognition, image processing, and bioinformatics. Accordingly, description that is directed towards the training of acoustic models may be applied towards the training of other models that are based on Hidden Markov Models.

Acoustic models are trained by aligning an observed audio sample to an expected progression of phone states. In particular, the expected progression of phone states may be derived from the structure of spoken language. During training of the acoustic models, an expected progression of phone states of a transcript is evaluated against a segment of speech, such as an utterance. Based on calculated observation probabilities, the transcript is aligned with the utterance. Further, portions of the utterance that are aligned with the phone states are then used to calculate Gaussian statistics that are used to improve the acoustic model and update the phone states themselves. As such, future interpretations of progressions of phone states based on similar progressions of similar observations may be more accurate.

The availability of general-purpose programmable many-core processing units, such as graphics processing units (GPU), and data parallel programming techniques has opened up new opportunities to effectively train acoustic models. For example, acoustic models may be trained significantly faster through the use of parallel programming techniques compared to acoustic models that are trained without these techniques. New algorithms and implementation techniques that focus on parallel scalability may expose the fine-grained concurrency in compute-intensive applications and exploit the concurrency on highly parallel multicore microprocessors. In particular, attempts to reduce overall times for training acoustic models may benefit from effectively organizing the training algorithm into threads and thread blocks and from leveraging available memory resources and synchronization capabilities to efficiently execute on a parallel computation platform.

This disclosure provides a new framework for rapid training of acoustic models using highly parallel manycore processing units. In particular, systems and methods are provided for optimizing effective throughput on graphics processing units that are used to train acoustic models. The manycore parallel computation platform is suitable for accelerating the exploration and validation of new designs for acoustic models through the use of parallel programming techniques.

Exemplary Hardware for Implementation

An example of a development platform that may be used to implement embodiments of the present invention includes a NVIDIA GTX580 GPU, which contains sixteen cores on-a-chip, two 16-wide (single instruction, multiple data) SIMD pipelines in a core, as well as hardware managed cache and software managed memory scratch pad. Further, the GPU may be programmed using CUDA™, a representative data-parallel programming environment where an application is organized into a sequential host program that is run on a central processing unit (CPU), and one or more parallel kernels running on a GPU. Each kernel describes a scalar sequential program that can be mapped across a set of parallel threads, which are organized into groups called thread blocks.

Methods of Optimizing Training of Acoustic Models

Disclosure is provided herein for methods of optimizing training of acoustic models. In particular, methods of calculating matching scores between phone states and acoustic frames across a matrix of an expected progression of phone states aligned with an observed progression of acoustic frames within an utterance are described. These methods may be used to make the calculation of the matching scores more efficient by distributing phone states and scheduling the calculations based on characteristics of the matrix. Additionally, embodiments are also provided for methods of optimizing the calculation of matching scores between phone states and acoustic frames across a matrix of an expected progression of phone states aligned with an observed progression of acoustic frames within an utterance. These methods may be used to train the acoustic models in an iterative manner so as to generate accurate phone states. Additionally, embodiments are provided for methods of optimizing determination of a path that demonstrates a best alignment of an expected progression of phone states and an observed progression of acoustic frames within an utterance.

Optimizing Alignment of an Utterance to an Expected Progression of Phone States

Acoustic models are trained to align an observed audio sample to an expected progression of phone states. To train an audio model, a waveform of a word is assessed against an expected progression of phone states that are derived from a transcript of the word. A waveform of a word is called an "utterance," and the utterance is compared to an expected progression of phone states of the transcript in an alignment across an X-Y coordination system. In particular, the comparison of the utterance to the progression of phone states is evaluated to determine how the utterance aligns with the expected progression of phone states.

When analyzing this comparison using a GPU, segments of the utterance are analyzed based on a portion of time. In particular, this column-based analysis compares a segment of the utterance against all possible phone states in the transcript. For instance, an audio clip of the utterance that is 0.01 seconds long may be evaluated by assessing that audio clip against the plurality of phone states associated with that utterance. Accordingly, the information from each phone state is accessed, loaded, and analyzed for each portion of time, or "acoustic frame," that is evaluated. The time it takes to access, load, and analyze each phone state is not only excessive when compared to the time it takes to load just one phone state, but it is also a bottleneck to the evaluation of future acoustic frames. In particular, the evaluation of subsequent acoustic frames is dependent upon the evaluation of a first acoustic frame when the acoustic frames are evaluated across a plurality of phone states in this acoustic frame-by-acoustic frame analysis.

Embodiments of this disclosure avoid these difficulties by evaluating a matrix based on a phone state-by-phone state analysis rather than based on an acoustic frame-by-acoustic frame analysis. Additionally, embodiments of this disclosure allow for the independent evaluation of phone states, allowing a plurality of phone states to be evaluated simultaneously across cores on a chip. This is in contrast to acoustic frame-by-acoustic frame methods discussed above, which are dependent upon completing the evaluation of previous acoustic frames before evaluating subsequent acoustic frames.

Accordingly, methods are provided for optimizing the calculation of matching scores between phone states and acoustic frames across a matrix of an expected progression of phone states aligned with an observed progression of acoustic frames within an utterance. In particular, a matching score of each characteristic phone state and characteristic observation is computed for each of the plurality of cells of the matrix, where each cell is associated with one phone state and one acoustic frame. The computation is optimized by scheduling the calculations of each cell on a core that stores a phone state associated with that cell. Accordingly, parallel computing aspects are exploited in the distribution of phone states across cores and in the scheduling of cell computations on the cores having a matching phone state that is associated with each cell. By utilizing the parallel structure of multiple processing units, processing time may be decreased dramatically. In particular, by storing a phone state on a local cache of a core that is used to compute matching scores of cells associated with that phone state, matching scores of cells associated with different phone states may be computed simultaneously, eliminating the backlog inherent in acoustic frame-by-acoustic frame structuring of calculations.

Once the matching scores between the phone states and the acoustic frames have been computed, additional information is incorporated to match a progression of phone states to a progression of acoustic frames. Each acoustic frame is aligned to be associated with one of the progression of phone states using the alignment. After alignment, each audio frame becomes a sample to train the model of the phone state it is aligned to. The model of the phone state is updated with the audio frames it is aligned with, and the Gaussian statistics of the components of the phone state can be re-estimated. The alignment and re-estimation process can be iterated multiple times.

Alignments that have been produced from a prior analysis may be used to guide a subsequent alignment of the expected progression of phone states aligned with an observed progression of acoustic frames. The guidance can be in the form of avoiding matching score computations that are not likely used in a best alignment path between the expected progression of phone states and an observed progression of acoustic frames. This avoiding of computation is often referred to as pruning, and is used to decrease processing time.

Once match scores are calculated for the cells of the matrix, a forward pass of the Viterbi algorithm is conducted across the matrix. In particular, this forward pass uses dynamic programming to arrive at a path of best alignment within the matrix. The path of best alignment is based on an optimal estimation of match likelihood between the expected progression of phone states and the observed progression of acoustic frames.

This forward pass is implemented as a time synchronous operation, where the computation for one cell is dependent on the results from a previous cell. Further, the computation of mapping the cells may be parallelized across thread blocks within a core. In particular, the computations of mapping the cells may be assessed by evaluating Gaussian mixture model (GMM) states in parallel. For example, each thread block may iterate sequentially over the time steps, with each thread handling the computation for one GMM state. This implementation would allow model transition probabilities and partial results to be cached in local caches, enabling the iteration of computation without incurring excessive memory operations to off-chip memory.

Optimizing by Utilizing Block Backtracking Evaluations

Alignment of an expected progression of phone states and an observed progression of acoustic frames within an utterance may be optimized by determining a path to anchor the alignment. In particular, determination of a path that demonstrates a best alignment may be optimized by performing backtrack computations across blocks of data in parallel.

A backtrack computation is performed after a forward pass has been computed. As described above, a forward pass assesses cells of the matrix in accordance with the Viterbi algorithm. In particular, this forward pass uses dynamic programming to arrive at an optimal estimation of match likelihood between the expected progression of phone states and the observed progression of acoustic frames.

After the forward pass has been computed, a backtrack computation is performed. In particular, the backtrack computation traces the path that demonstrates the best alignment of the expected progression of phone states and an observed progression of acoustic frames within an utterance. The backtrack computation starts from a beginning anchor cell of a matrix that is used to compare the phone states and the acoustic frames. In particular, the beginning anchor cell is the cell of the matrix that is associated with both 1) the last phone state in the expected progression of phone states, and 2) the last acoustic frame of the acoustic observation. The backtrack computation is then computed cell-by-cell until an alignment is determined from the beginning anchor cell to an ending anchor cell, where the ending anchor cell is the cell of the matrix that is associated with both 1) the first phone state in the expected progression of phone states, and 2) the first acoustic frame of the acoustic observation. In particular, the matching scores of each cell previous to the last-computed cell are compared through the use of a pointer chasing operation.

The pointer chasing operation involves two memory round trips per time step. As such, the pointer chasing operation can take 100,000s processor cycles to backtrack 400 steps without the use of optimized pre-fetching. As such, it is desirable to pre-fetch blocks of cells to be evaluated using the backtrack computation. In particular, blocks of cells are pre-fetched and stored locally in the cache of the chip.

Portions of the matrix may be parsed into blocks that may be pre-fetched. Further, pre-fetched blocks may be allotted/divided based on a size of a local cache to store the pre-fetched blocks. Additionally, in a backtrack computation, a first block may comprise the ending anchor cell, which is the first cell to be evaluated by within the matrix. Once the first block has been pre-fetched, the first block is stored on a local cache and then evaluated. In particular, a pointer chasing operation evaluates the matching score of neighboring cells. The cell having the highest value among the neighboring cells is chosen and is determined to be a locally optimal solution. From this chosen cell, the analysis is run again on the neighboring cells.

Additionally, boundary detection is performed. In particular, boundary detection is performed to determine whether the next cell to be evaluated is within the first block of data. If the next cell is not within the next block of data, then a boundary of the first block is detected. Once the boundary of a first block is detected, a second starting point is identified. Based on the identification of the second starting point, a second block of data is pre-fetched and stored locally in the cache of the chip. The second block of data is then evaluated using the pointer chasing operation from local cache. When the boundary detection finds that there is not a next cell, then a determination is made that the boundary of the block has been detected; but also, another determination is made that the cell is the ending cell.

After backtrack, a plurality of locally optimal solutions may be determined. These are used to determine a global optimal solution. In particular, the globally optimal solution may comprise each locally optimal solution. Further, the globally optimal solution may be demonstrated as the path of the best alignment within the matrix.

Optimizing by Accounting for Local and Global Influences

Once a path of best alignment across the matrix has been determined, the information from the cells that have been identified as being along the path of best alignment is used to update the content of the phone states of the progression of phone states. In particular, a histogram is generated to compare a statistical distribution of the training set based on the Viterbi algorithm. The generation of the histogram includes the aggregation of statistics across phone states of the matrix as well as similar matrices that are used to analyze the 1,000+ hours of acoustic training data. However, the aggregation of statistics is complicated by the potential for data overflow of the data that needs to be accumulated.

Accordingly, embodiments provide a hybrid local-global accumulation method to account for aggregated statistics while generating a histogram. In particular, embodiments aggregate statistics locally within utterances, and then merge the local statistics into a global model. As such, numerical issues that may otherwise plague likelihood accumulations are handled when merging local values with global values. For example, overflow detection is performed such that aggregated statistics that are at risk for overflowing their respective histogram bins are represented using floating number values so as to accommodate further data. Further, underflow detection is performed in aggregating the histogram statistics to make sure data points are not discard because of rounding errors.

Description Of Figures

FIG. 1 illustrates a parallel computing architecture, in accordance with embodiments of the present invention. In particular, FIG. 1 is consistent with highly parallel processors having a common fundamental architecture of having multiple independent cores that communicate through a shared memory hierarchy. Accordingly, FIG. 1 comprises chip 110, cores 120, local caches 130, and shared memory 140. In particular, chip 110 has six cores 120, with each core 120 having a local cache 130. Each core 120 is also connected to a shared memory 140. While local cache 130 and shared memory 140 may both be used to store information, it is more efficient for a core 120 to retrieve information from its local cache 130 than it is for the core 120 to retrieve information from the shared memory 140. This is because the core 120 associated with a local cache 130 is in closer proximity to its local cache 130 than it is to the shared memory 140.

The opportunity for new methods is to take advantage of the fine-grained and fast communication capabilities of a shared memory hierarchy on manycore processors. This architecture may be used to provide the most efficient synchronization strategy between concurrently running tasks to satisfy the application functional requirements. Accordingly, methods provided may be used for the training of statistical models used in Hidden Markov Models-based applications, with a reduction-to-practice that may be directed towards statistical models used in speech recognition.

Figure 2:
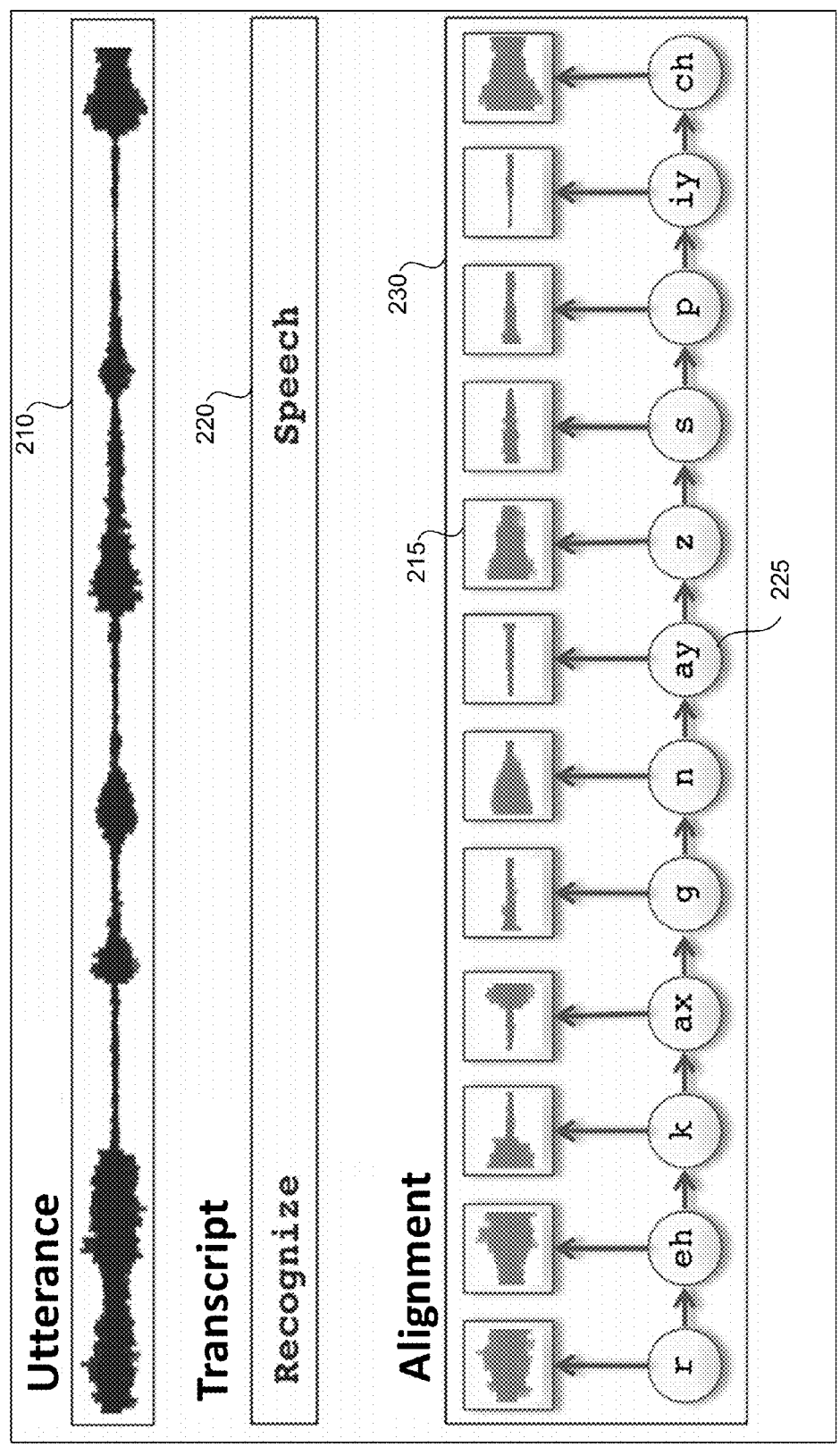
FIG. 2 illustrates an alignment of an utterance with a transcript, in accordance with embodiments of the present invention.

FIG. 2 illustrates an alignment of an utterance with a transcript, in accordance with embodiments of the present invention. In particular, FIG. 2 comprises an utterance 210. An utterance comprises a segment of speech. FIG. 2 also comprises acoustic frames 215. Each acoustic frame 215 is a portion of utterance 210. Additionally, FIG. 2 comprises transcript 220 of representative words. In particular, words that are represented by transcript 220 are parsed into phones 225. Utterance 210 is associated with transcript 220 in the form of an alignment 230. In particular, utterance 210 is aligned with transcript 220 such that each phone 225 is associated with an acoustic frame 215.

Additionally, an alignment similar to that shown in FIG. 2 may be used for the training of additional models, such as hand-writing recognition models. For example, an observed signature may be aligned with a progression of expected states of a signature. Accordingly, an alignment similar to that seen in FIG. 2 may be used to illustrate a method of optimizing the calculation of matching scores between states of an expected signature and observations of an observed signature. In particular, the calculations may be computed across a matrix of an expected progression of signature states aligned with an observed progression of signature observations, such as hand-written observations, in accordance with embodiments of the present invention.

As a further example, an alignment similar to that shown in FIG. 2 may be used for the training of image processing models. For example, an observed image may be aligned with a progression of expected states of an image. Accordingly, an alignment similar to that seen in FIG. 2 may be used to illustrate a method of optimizing the calculation of matching scores between states of an expected image and observations of an observed image. In particular, the calculations may be computed across a matrix of an expected progression of image states aligned with an observed progression of image observations, in accordance with embodiments of the present invention.

Regarding the field of bioinformatics, an alignment similar to that shown in FIG. 2 may be used for the training of DNA sequencing models. For example, an observed progression of optical or electrical signals from a DNA sequencing machine may be aligned with a progression of expected states of a DNA sequence. Accordingly, an alignment similar to that seen in FIG. 2 may be used to illustrate a method of optimizing the calculation of matching scores between states of a DNA sequence and observations of an observed optical or electrical signal. In particular, the calculations may be computed across a matrix of an expected progression of a DNA sequence aligned with an observed progression of optical or electrical signal observations, in accordance with embodiments of the present invention.

Figure 3:
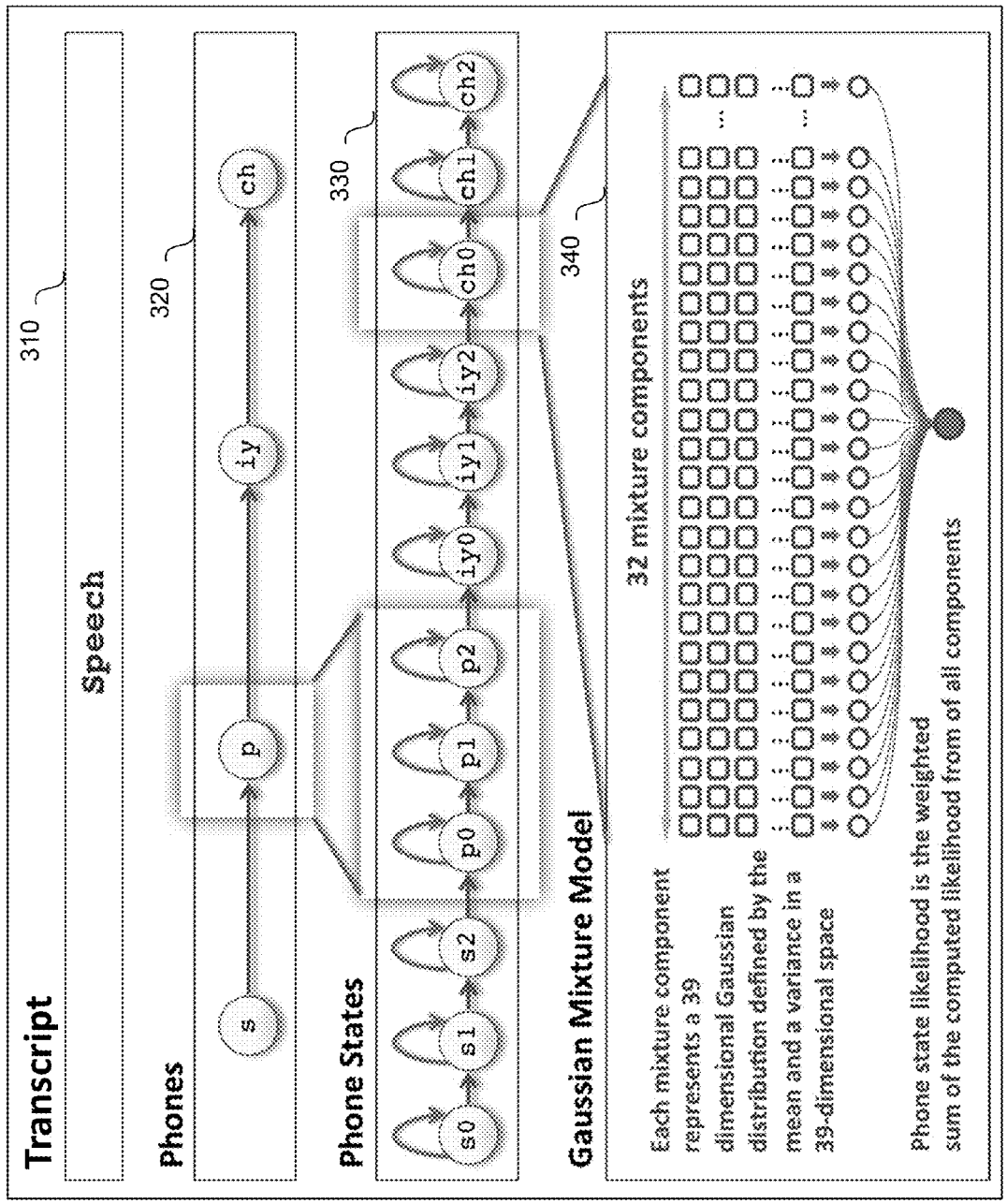
FIG. 3 illustrates an acoustic model, in accordance with embodiments of the present invention.

FIG. 3 illustrates an acoustic model, in accordance with embodiments of the present invention. FIG. 3 comprises transcript 310, which is parsed into phones 320. In particular, transcript 310 is parsed into phones "s"; "p"; "iy"; and "ch." Further, each phone 320 is parsed into phone states 330. In particular, phone "s" is parsed into phone states "s0"; "s1"; and "s2." Similarly, phones "p"; "iy"; and "ch" are parsed into three components as illustrated in FIG. 3. Each phone state likelihood is a weighted computed sum of all 32 components of a Gaussian mixture model, and each component is represented by a 39 dimensional vector space, as illustrated by gaussian mixture model 340.

Figure 4:
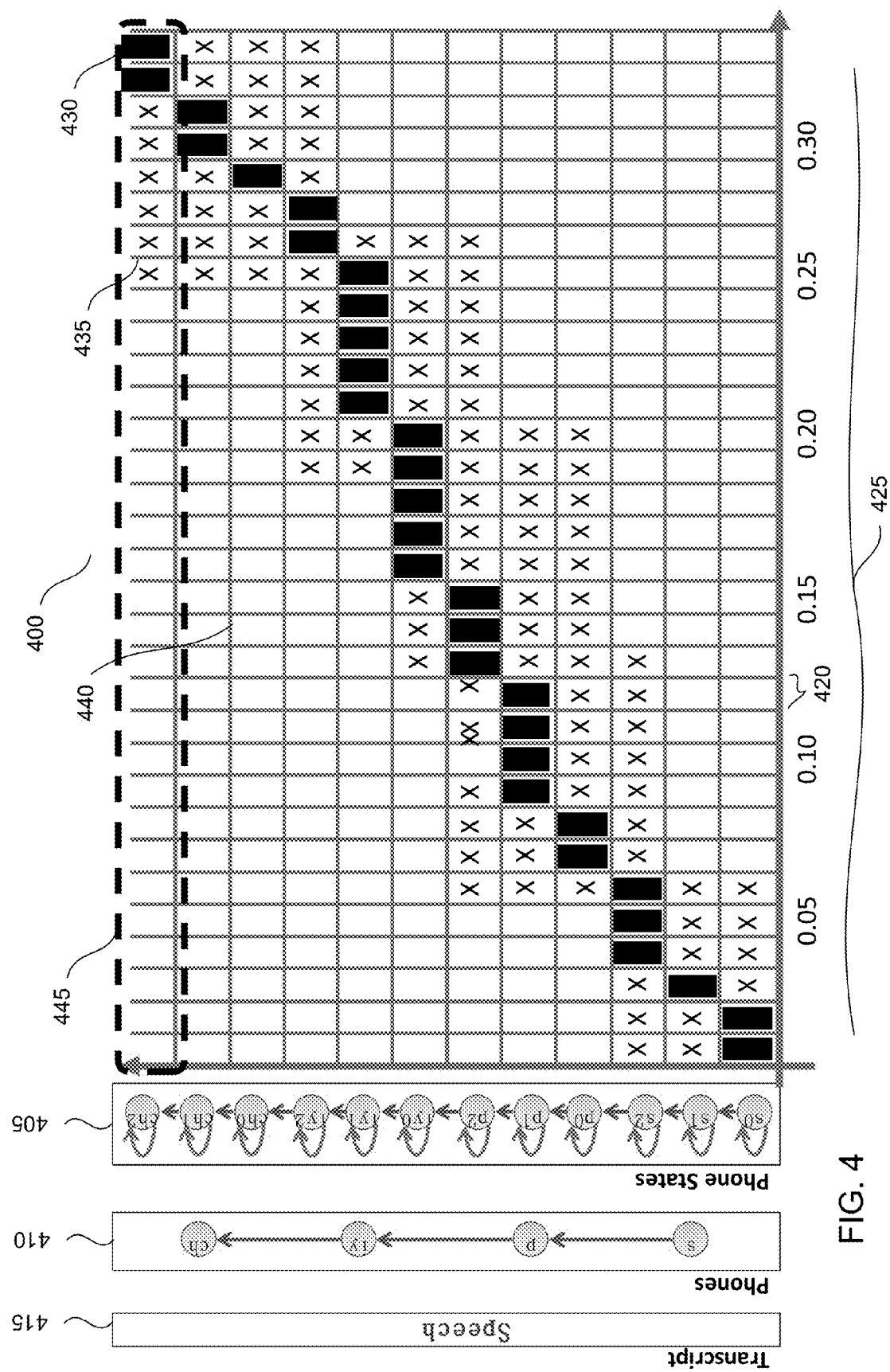
FIG. 4 illustrates a matrix for computing matching scores, in accordance with embodiments of the present invention.

FIG. 4 illustrates a matrix for computing matching scores, in accordance with embodiments of the present invention. Matrix 400 of FIG. 4 represents an expected progression of phone states 405 parsed from phones 410 of transcript 415 and aligned with an observed progression of acoustic frames 420 within an utterance 425. Each cell 430 of matrix 400 is associated with one phone state 405 and one acoustic frame 420. Further, an observation probability is evaluated for each cell within matrix 400. An observation probability illustrates the degree to which an acoustic frame matches a phone state. Each dark cell 430 represents anchoring cells that represent an alignment path derived from prior analysis; each cell marked with "X" 435 represents a cell that has a higher likelihood of being in a new alignment path; and each unmarked cell 440 represents computation that may be avoided. Cells 430, 435, and 440 are also associated with a row, such as row 445. Each row 445 is associated with a particular phone state 405.

Figure 5:
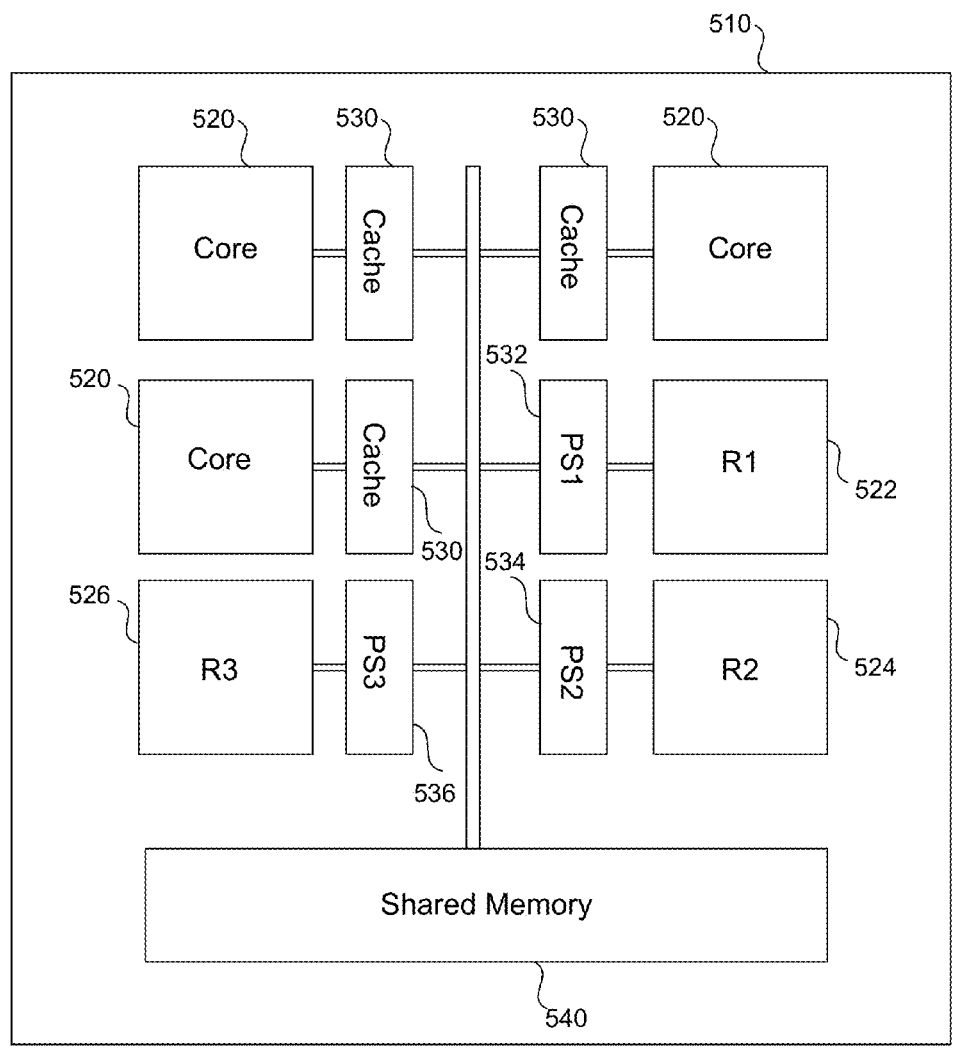
FIG. 5 illustrates the distribution of phone states and the scheduling of cell match score calculations across cores of a chip, in accordance with embodiments of the present invention.

As discussed above, the evaluation of observation probabilities is more efficient when the observation probabilities are computed using parallel computing methods. In particular, the processing of the observation probabilities may be evaluated simultaneously across cores on a chip. Accordingly, FIG. 5 illustrates the distribution of phone states and the scheduling of cell match score calculations across cores of a chip, in accordance with embodiments of the present invention. FIG. 5 comprises chip 510, cores 520, 522, 524, 526, caches 532, 534, 536, and shared memory 540. As seen in FIG. 5, cache 532 has a first phone state, "PS1," stored therein. Further, each cell of a first row is stored on core 522, as represented by "R1." Each cell of the first row is associated with the first phone state, "PS1." Similarly, a each cell of a second row, "R2," is associated with a second phone state, "PS2," and each cell of a third row, "R3," is associated with a third phone state, "PS3." As seen in FIG. 5, each cell of the second row "R2" is stored on core 524 while the second phone state "PS2" is stored on cache 534. Further, each cell of the third row "R3" is stored on core 526 while the third phone state "PS3" is stored on cache 536. As such, each cell that is associated with a phone state of the progression of phone states has a match score that is calculated on the same core that stores the information of that phone state.

Figure 6:
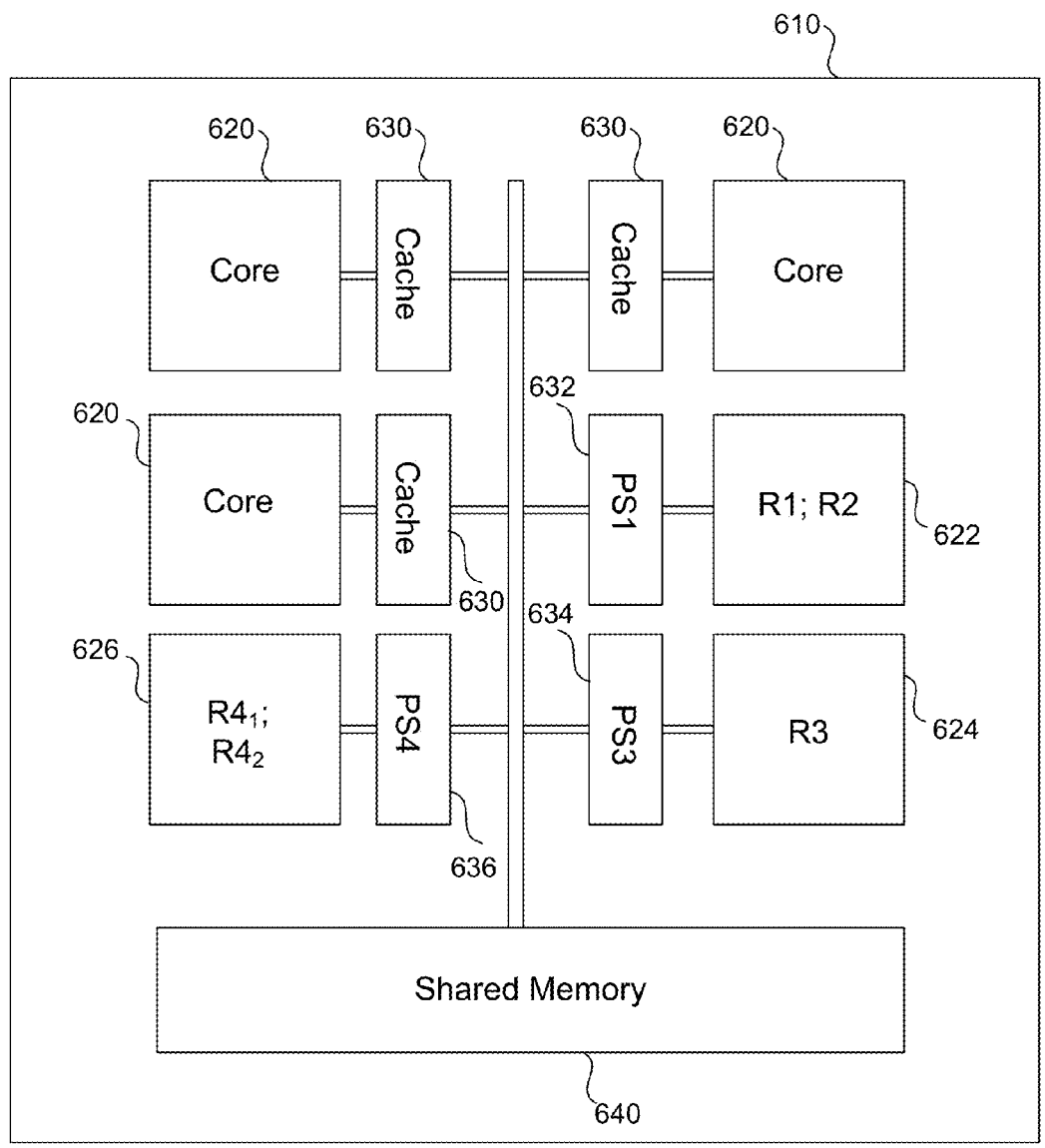
FIG. 6 illustrates the distribution of processes across cores of a chip, in accordance with embodiments of the present invention.

FIG. 6 illustrates the distribution of processes across cores of a chip, in accordance with embodiments of the present invention. FIG. 6 comprises chip 610, cores 622, 624, 626, caches 632, 634, 636, and shared memory 640. As seen in FIG. 6, cache 632 has a first phone state, "PS1," stored therein. Further, each cell of a first row is stored on core 622, as represented by "R1." Each cell of the first row is associated with the first phone state, "PS1." Additionally, a each cell of a second row, "R2," is associated with the first phone state, "PS1," while each cell of a third row, "R3," is associated with a third phone state, "PS3."

As seen in FIG. 6, each cell of the second row "R2" is stored on core 622 while the second phone state "PS1" is stored on cache 632. As such, each cell of the first row "R1" and each cell of the second row "R2" are stored on core 622. This is due to the cells of the first row "R1" and the cells of the second row "R2" each being associated with the first phone state "P1." Alternatively, each cell of the second row "R2" may be associated with a second phone state that is identical to the first phone state "P1." This is in contrast to each cell of the third row "R3," stored on core 624, which is associated with the third phone state "PS3," stored on cache 634. As such, each cell that is associated with a phone state of the progression of phone states has a match score that is calculated on the same core that stores the information of that phone state.

Additionally, FIG. 6 illustrates how two rows associated with the same phone state may be assessed against the phone state across two match score calculations. In particular, FIG. 6 also includes cache 636 and core 626. In particular, cache 636 store fourth phone state "PS4" while core 626 stores a each cell of a fourth row of a first matrix, "R4$_1$." Each cell of the fourth row of the first matrix "R4$_1$" is evaluated against the fourth phase state "PS4." Additionally, each cell of the fourth row of a second matrix, "R4$_2$," may also be evaluated against the fourth phase state "PS4." In this way, each cell may be evaluated with efficient storage of the fourth phone state "PS4."

Figure 7:
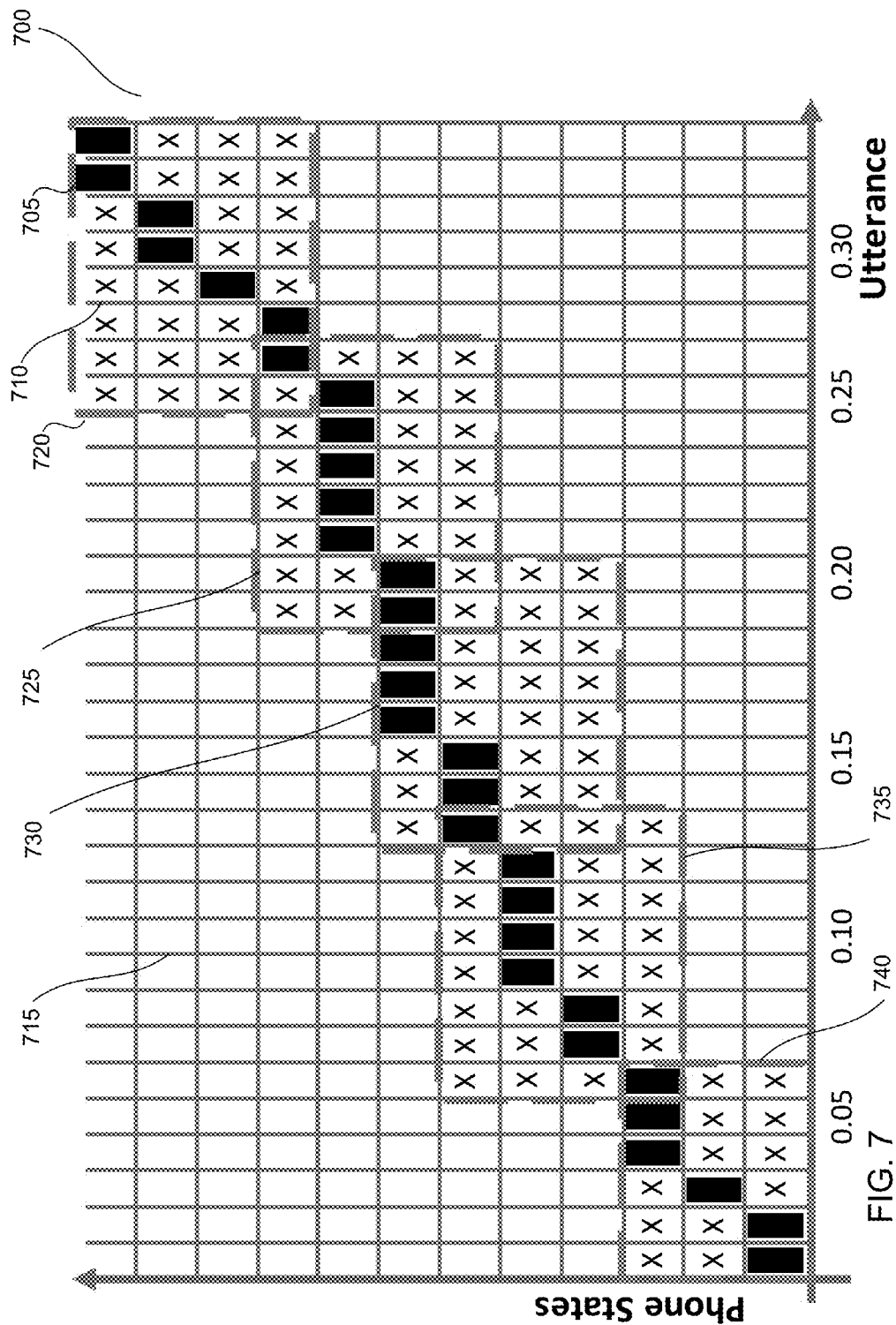
FIG. 7 illustrates a matrix divided into overlapping prefetch blocks, in accordance with embodiments of the present invention.

FIG. 7 illustrates a matrix divided into overlapping prefetch blocks, in accordance with embodiments of the present invention. In particular, FIG. 7 comprises matrix 700 having a plurality of cells 705, 710, and 715 within matrix 700. Additionally, the matrix is divided into prefetch blocks 720-740. Matrix 700 is composed of cells 705 and 710 that are evaluated to determine an alignment of an expected progression of phone states to an observed utterance. As discussed above, an observation probability is evaluated for each cell within matrix 700. An observation probability illustrates the degree to which an acoustic frame matches a phone state. Each dark cell 705 represents anchoring cells that represent an alignment path derived from prior analysis; each cell marked with "X" 710 represents a cell that has a higher likelihood of being in a new alignment path; and each unmarked cell 715 represents computation that may be avoided. Further, matrix 700 is divided into prefetch blocks 720-740, where each prefetch block may contain cells 705 and 710. Accordingly, cells 705 and 710 within each prefetch block 720-740 are evaluated to determine a matching score for each of cells 705 and 710. These evaluations are computed during a forward pass across the matrix.

After the forward pass has been evaluated, a backtrack computation is performed. In particular, the backtrack computation traces a path that demonstrates the best alignment of the expected progression of phone states to the observed acoustic frames of the utterance.

While the backtrack computation is performed on a cell-by-cell basis, the amount of information that is retrieved for evaluation comprises a block of data 720-740. In particular, blocks are data 720-740 are prefetched to optimize the efficiency of evaluating the data from a local cache on a chip. Prefetching blocks of data 720-740 is beneficial because the backtrack computation is performed using a pointer chasing operation. Without the use of prefetching blocks of data 720-740, pointer chasing operating involves two memory round trips per time step, which can take 100,000s processor cycles to backtrack 400 steps. By loading blocks of data 720-740, however, the pointer chasing operation only needs to retrieve additional cells from the memory when the cells within a first block of data have been analyzed.

Figure 8:
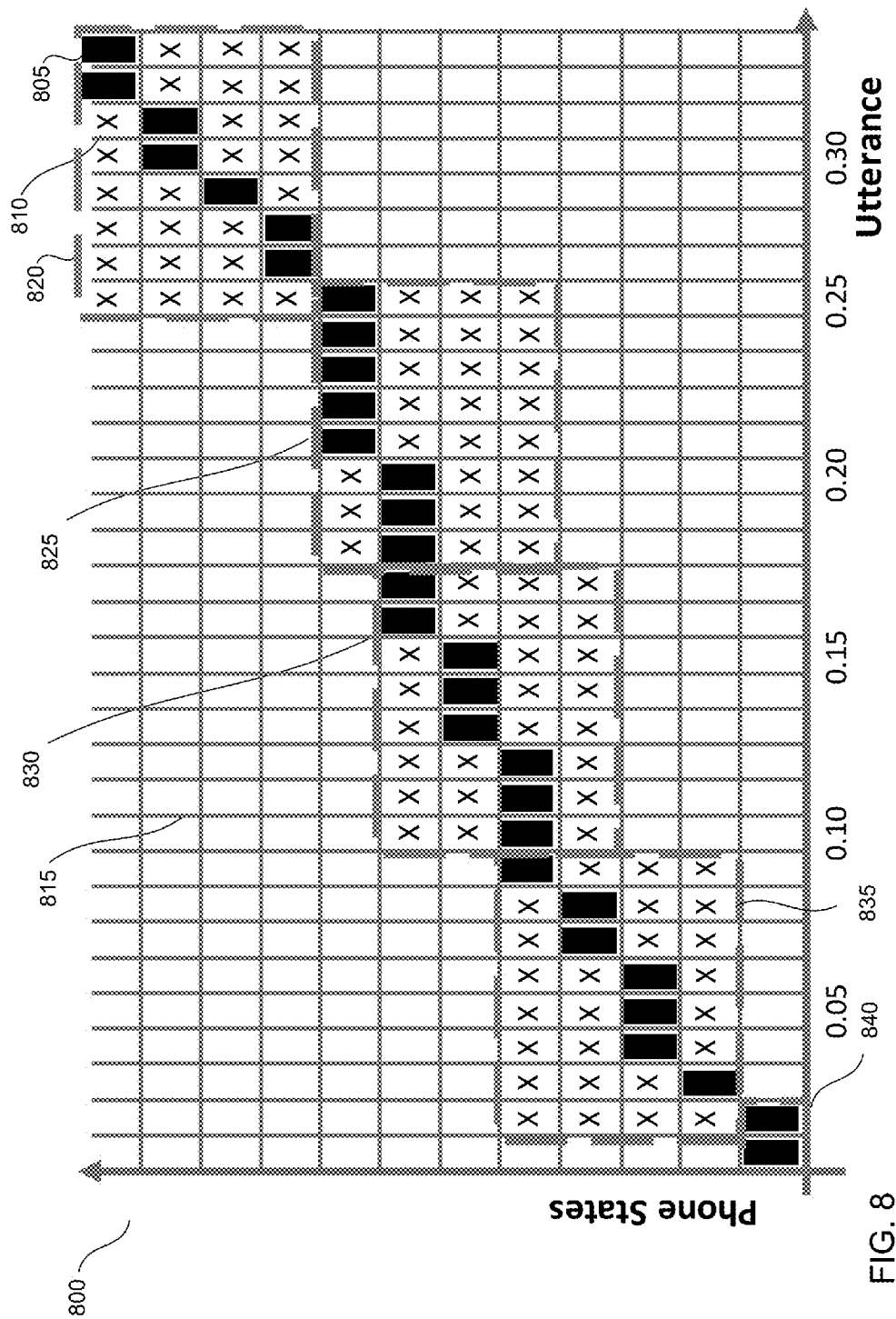
FIG. 8 illustrates a view of a matrix divided into separated prefetch blocks, in accordance with embodiments of the present invention.

As such, it is desirable to prefetch blocks of cells to be evaluated using the backtrack computation. While FIG. 7 illustrates prefetched blocks of data 720-740 that are overlapping, FIG. 8 illustrates a view of a matrix 800 divided into separated prefetch blocks, in accordance with embodiments of the present invention. In particular, FIG. 8 comprises matrix 800 having a plurality of cells 805, 810, and 815 within matrix 800. Additionally, the matrix is divided into prefetch blocks 820-840. Matrix 800 is composed of cells 805 and 810 that are evaluated to determine an alignment of an expected progression of phone states to an observed utterance. As discussed above, an observation probability is evaluated for each cell within matrix 800. An observation probability illustrates the degree to which an acoustic frame matches a phone state. Each dark cell 805 represents anchoring cells that represent an alignment path derived from prior analysis; each cell marked with "X" 810 represents a cell that has a higher likelihood of being in a new alignment path; and each unmarked cell 815 represents computation that may be avoided. Further, matrix 800 is divided into prefetch blocks 820-840, where each prefetch block may contain cells 805 and 810. Accordingly, cells 805 and 810 within each prefetch block 820-840 are evaluated to determine a matching score for each of cells 805 and 810. Prefetched blocks of data 820-840 are stored in local cache of a chip. As seen in FIG. 8, a first block of data 820 comprises a first anchor cell. The first anchor cell has a characteristic last phone state in an expected progression of phone states, and also has a characteristic last acoustic frame of the utterance. Additionally, the amount of data within first block of data 820 may be determined based on the amount of memory within a shared cache of the chip. In particular, in some embodiments, the amount of data within first block of data 820 is maximized based on the size of the shared cache of the chip. Accordingly, in these embodiments, the load bandwidth is fully utilized and the memory latency caused by the pointer chasing operations in the backtrack computation is minimized Once first block of data 820 has been prefetched, the pointer chasing operation is used to evaluate the matching scores of the cells within the first block of data 830. In particular, the pointer chasing operation begins with the first anchor cell and evaluates neighboring cells to the direct left and to the bottom left corner of the first anchor cell. In its evaluation, the pointer chasing operation evaluates which neighboring cell has the highest matching score. In particular, the point chasing operation determines whether the cell to the direct left of the first anchor cell has a higher matching score than the cell to the bottom left corner of the first anchor cell. The cell having the highest matching score is determined to be the locally optimal solution associated with the second-to-last acoustic frame of the matrix. The first anchor cell is determined to be the locally optimal solution associated with the last acoustic frame of the matrix.

This evaluation of cells is continued until a boundary of first block of data 820 has been reached. Boundary detection is performed to determine whether a next cell to be evaluated is within first block of data 820. If the next cell to be evaluated is not within first block of data 820, then a second block of data 825 is loaded. In particular, the second block of data is loaded based on a second starting point, such as cell 807. In other embodiments, the second starting point may also be within first block of data, as seen in FIG. 7. As such, in FIG. 7 there is overlap between first block of data 720 and second block of data 725. The second block of data is then evaluated based on the second starting point. In contrast, the prefetched blocks of data 820-840 are separated such that second anchor cell 807 is within a second block of data 825, there being no overlap being first block of data 820 and second block of data 825. Additionally, as with first block of data 820, locally optimal solutions may be determined. In particular, a locally optimal solution may be determined for each portion of the utterance. Further, a first plurality of locally optimal solutions that are determined to be within the first block of data 820 may be combined with a second plurality of locally optimal solutions that are determined to be within the second block of data 825. In particular, the first plurality of locally optimal solutions and the second plurality of the locally optimal solutions may be combined to be within a path of best alignment across the matrix, as discussed above.

The backtrack computation may be continued until boundary detection determines that there is not a next cell to be analyzed. Once it has been determined that there is not a next cell to be analyzed, a determination is made that an ending cell has been reached. In particular, the ending cell comprises an ending anchor cell. The ending anchor cell has a characteristic first phone state in the expected progression of phone states, and also has a characteristic first acoustic frame of the utterance.

The evaluation of the backtrack computation is used to determine a path that demonstrates a best alignment of an expected progression of phone states and an observed progression of acoustic frames. Additionally, the path may be determined based on the locally optimal solutions within the blocks of data. In particular, the path may comprise the locally optimal solutions.

Figure 9:
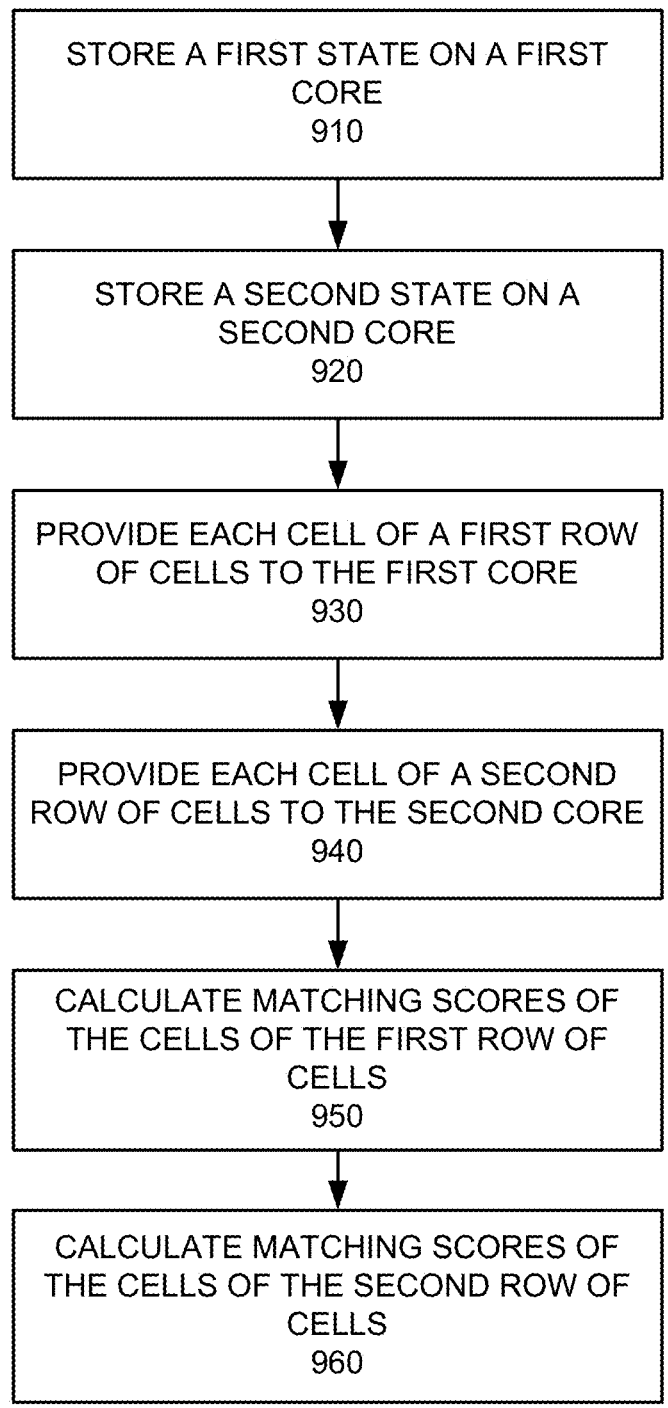
FIG. 9 illustrates a first flow chart of a method of optimizing the calculation of matching scores between states and observations across a matrix of an expected progression of states aligned with an observed progression of observations, in accordance with embodiments of the present invention.

FIG. 9 illustrates a first flow chart of a method of optimizing the calculation of matching scores between states and observations across a matrix of an expected progression of states aligned with an observed progression of observations, in accordance with embodiments of the present invention. In particular, the matrix includes a plurality of cells. Each cell of the plurality of cells is associated with a characteristic observation. In particular, each observation is a portion of the progression of observations. For example, in speech recognition, a progression of observations may be an utterance consisting of a sequence of acoustic frames. Additionally, a duration of each observation may be the same for each cell. For example, each observation may have a duration of 0.01 seconds. Further, each cell of the plurality of cells is also associated with a characteristic state. In particular, each state is a state of the progression of states. Additionally, each state is associated with a position within the progression of states.

The plurality of cells also comprises at least one anchor point. In particular, a first anchor point may comprise a cell associated with a first state of the progression of states, where the cell is further associated with a first observation of the progression of observations. Further, a second anchor point may comprise a cell associated with a last state of the progression of states, where the cell is further associated with a last observation of the progression of observations.

At 910, a first state is stored on a first core. For example, a model representing the first state may be stored on the first core. Alternatively, an identifier that represents the first state may be stored on the first core. In particular, the first state is stored on a local cache of the first core. Further, the first state is a state of the progression of states. The first state is also associated with a position within the progression of states. Additionally, a plurality of states may be stored on the local cache of the first core. For example, another state may be stored on the local cache of the first core along with the first state that is stored on the local cache of the first core.

At 920, a second state is stored on a second core. For example, a model representing the second state may be stored on the second core. Alternatively, an identifier that represents the second state may be stored on the second core. In particular, the second state is stored on a local cache of the second core. Further, the second state is a state of the progression of states. The second state is also associated with a position within the progression of states. The position associated with the first state differs from the position associated with the second state. Further, the content of the first state may differ from the content of the second state. Alternatively, the content of the first state may match the content of the second state.

At 930, each cell of a first row of cells is provided to the first core. In particular, each cell of the first row of cells has a state that matches the first state.

At 940, each cell of a second row of cells is provided to the second core. In particular, each cell of the second row of cells has a state that matches the second state.

At 950, matching scores of the cells of the first row of cells are calculated. In particular, the matching scores of the cells of the first row are cells are calculated on the first core. The matching scores of each cell of the first row of cells may be calculated simultaneously.

At 960, matching scores of the cells of the second row of cells are calculated. In particular, the matching scores of the cells of the second row of cells are calculated on the second core. The matching scores of each cell of the second row of cells may be calculated simultaneously. Further, the matching scores of each cell of the first row of cells and each cell of the second row of cells may be calculated simultaneously.

Anchor points may be selected by using information from external information sources. In particular, one selection may be estimated using alignment of the same progression of states and the same progression of observations in a prior aligned run with different parameters within the same progression of states.

Figure 10:
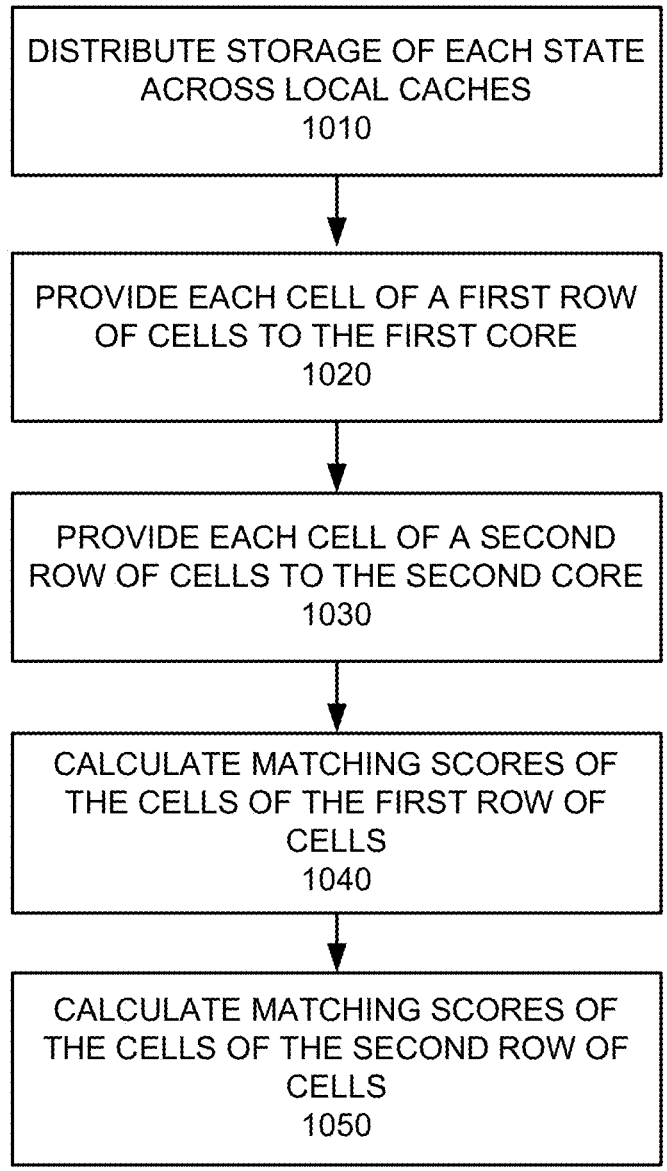
FIG. 10 illustrates a second flow chart of a method of optimizing the calculation of matching scores between states and observations across a matrix of an expected progression of states aligned with an observed progression of observations, in accordance with embodiments of the present invention.

FIG. 10 illustrates a second flow chart of a method of optimizing the calculation of matching scores between states and observations across a matrix of an expected progression of states aligned with an observed progression of observations, in accordance with embodiments of the present invention. In particular, the matrix includes a plurality of cells. Each cell of the plurality of cells is associated with a characteristic observation. In particular, each observation is a portion of the progression of observations. For example, in speech recognition, a progression of observations may be an utterance consisting of a sequence of acoustic frames. Additionally, a duration of each observation may be the same for each cell. Further, each cell of the plurality of cells is also associated with a characteristic state. In particular, each state is a state of the progression of states. Additionally, each state is associated with a position within the progression of states.

The plurality of cells also comprises at least one anchor point. In particular, a first anchor point may comprise a cell associated with a first state of the progression of states, where the cell is further associated with a first observation of the progression of observations. Further, a second anchor point may comprise a cell associated with a last state of the progression of states, where the cell is further associated with a last observation of the progression of observations.

At 1010, storage of each state is distributed across local caches. In particular, each state of the progression of states is distributed across a plurality of local caches on a chip. In one example, each state may be distributed to a local cache based on an amount of storage space available on the local cache. In particular, under the example, each state may be distributed to the local cache having the greatest amount of available space at the time the state is distributed. In a further example, each state may be distributed to a local cache based on the speed of the local cache. In particular, under the further example, each state may be distributed to the local cache having the greatest amount of available speed at the time the state is distributed.

At 1020, each cell of a first row of cells is provided to the first core. In particular, each cell of the first row of cells has a state that matches the first state. In one example, the first state is stored on the first core. In particular, the first state may be stored on a local cache of the first core. Further, the first state is a state of the progression of states. The first state is also associated with a position within the progression of states. Additionally, a plurality of states may be stored on the local cache of the first core. For example, another state may be stored on the local cache of the first core along with the first state that is stored on the local cache of the first core.

At 1030, each cell of a second row of cells is provided to the second core. In particular, each cell of the second row of cells has a state that matches the second state. In one example, a second state is stored on a second core. In particular, the second state is stored on a local cache of the second core. Further, the second state is a state of the progression of states. The second state is also associated with a position within the progression of states. The position associated with the first state differs from the position associated with the second state. Further, the content of the first state may differ from the content of the second state. Alternatively, the content of the first state may match the content of the second state.

At 1040, matching scores of the cells of the first row of cells are calculated. In particular, the matching scores of each cell of the first row are cells are calculated on the first core. The matching scores of each cell of the first row of cells may be calculated simultaneously.

At 1050, matching scores of the cells of the second row of cells are calculated. In particular, the matching scores of each cell of the second row are cells are calculated on the second core. The matching scores of each cell of the second row of cells may be calculated simultaneously. Further, the matching scores of each cell of the first row of cells and each cell of the second row of cells may be calculated simultaneously.

Figure 11:
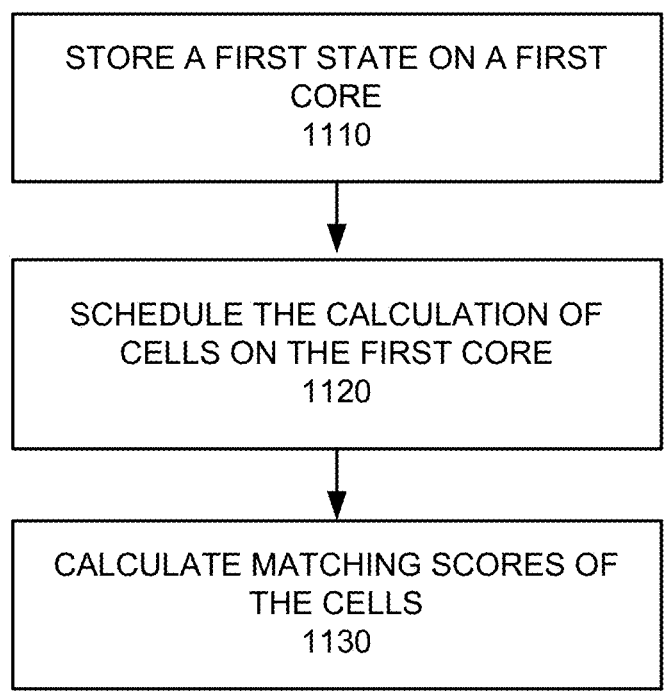
FIG. 11 illustrates a third flow chart of a method of optimizing the calculation of matching scores between states and observations across a matrix of an expected progression of states aligned with an observed progression of observations, in accordance with embodiments of the present invention.

FIG. 11 illustrates a third flow chart of a method of optimizing the calculation of matching scores between states and observations across a matrix of an expected progression of states aligned with an observed progression of observations, in accordance with embodiments of the present invention. In particular, the matrix includes a plurality of cells. Each cell of the plurality of cells is associated with a characteristic observation. In particular, each observation is a portion of the progression of observations. For example, in speech recognition, a progression of observations may be an utterance consisting of a sequence of acoustic frames. Additionally, a duration of each observation may be the same for each cell. Further, each cell of the plurality of cells is also associated with a characteristic state. In particular, each state is a state of the progression of states. Additionally, each state is associated with a position within the progression of states.

The plurality of cells also comprises at least one anchor point. In particular, a first anchor point may comprise a cell associated with a first state of the progression of states, where the cell is further associated with a first observation of the progression of observations. Further, a second anchor point may comprise a cell associated with a last state of the progression of states, where the cell is further associated with a last observation of the progression of observations.

At 1110, a first state is stored on a first core. In particular, the first state may be stored on a local cache of the first core. Further, the first state is a state of the progression of states. The first state is also associated with a position within the progression of states. Additionally, a plurality of states may be stored on the local cache of the first core. For example, another state may be stored on the local cache of the first core along with the first state that is stored on the local cache of the first core.

At 1120, the calculation of matching scores of cells on the first core is scheduled. In particular, the calculation of matching scores is scheduled for each cell of a first row of cells on the first core. Further, each cell of the first row of cells is associated with the first state.

At 1130, the matching scores of the cells are calculated. In particular, the matching scores of the cells are calculated on the first core. Further, the cells are cells of the first row of cells. The matching scores of each cell of the first row of cells may be calculated simultaneously.

In a further embodiment, the calculation of matching scores of a second row of cells may be scheduled on the first core. In particular, each cell of the second row of cells may be associated with the first state. Further, the matching scores of the second row of cells may be calculated on the first core.

Figure 12:
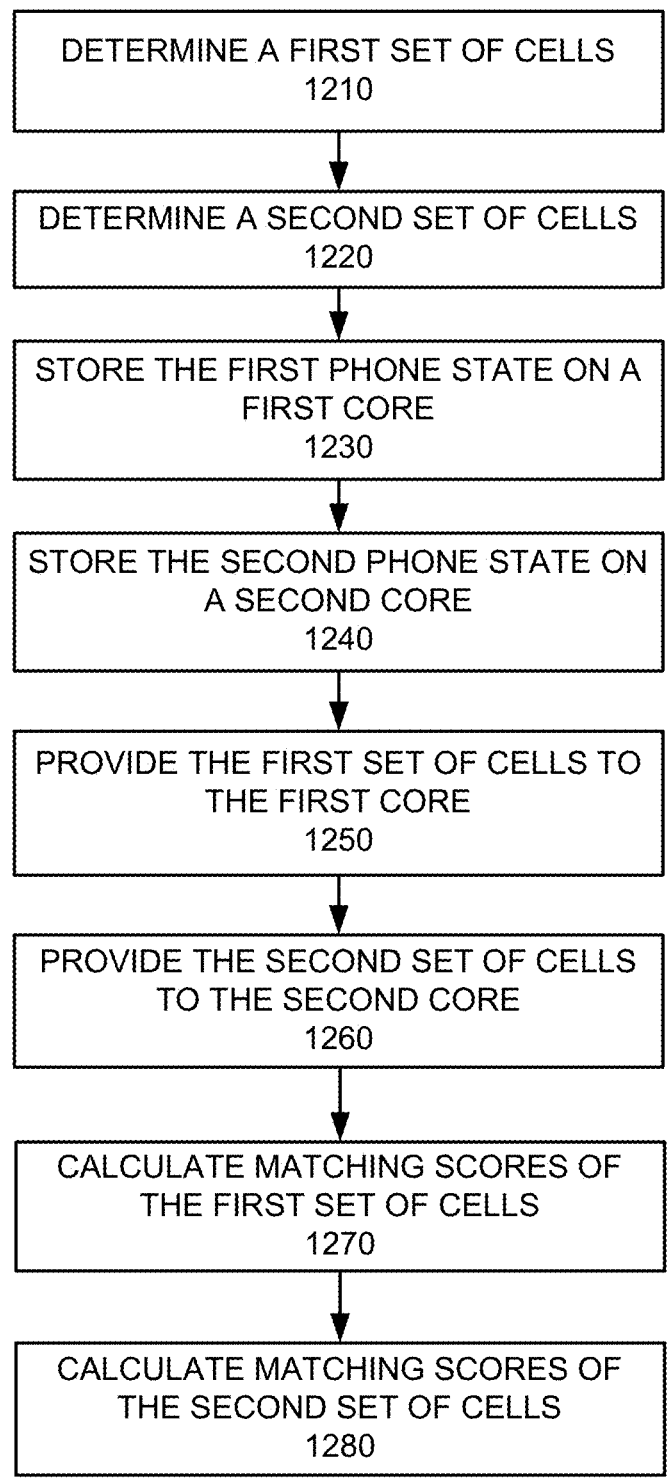
FIG. 12 illustrates a first flow chart of a method of optimizing the calculation of matching scores between phone states and acoustic frames across a matrix of an expected progression of phone states aligned with an observed progression of acoustic frames within an utterance, in accordance with embodiments of the present invention.

FIG. 12 illustrates a first flow chart of a method of optimizing the calculation of matching scores between phone states and acoustic frames across a matrix of an expected progression of phone states aligned with an observed progression of acoustic frames within an utterance, in accordance with embodiments of the present invention. In particular, the matrix includes a plurality of cells. Each cell of the plurality of cells is associated with a characteristic acoustic frame. In particular, each acoustic frame is a portion of the utterance. An utterance comprises a segment of speech. Additionally, a duration of each acoustic frame may be the same for each cell. Further, each cell of the plurality of cells is also associated with a characteristic phone state. In particular, each phone state is a phone state of the progression of phone states. Additionally, each phone state is associated with a position within the progression of phone states.

At 1210, a first set of cells is determined. In particular, the first set of cells is within a first row. Further, the first row is associated with a first phone state of the progression of phone states. Additionally, each cell of the first set of cells has a high probability of matching the first phone state.

At 1220, a second set of cells is determined. In particular, the second set of cells is within a second row. Further, the second row is associated with a second phone state of the progression of phone states. Additionally, each cell of the second set of cells has a high probability of matching the second phone state.

At 1230, a first phone state is stored on a first core. In particular, the first phone state is stored on a local cache of the first core. Further, the first phone state is a phone state of the progression of phone states. The first phone state is also associated with a position within the progression of phone states. Additionally, a plurality of phone states may be stored on the local cache of the first core. For example, another phone state may be stored on the local cache of the first core along with the first phone state that is stored on the local cache of the first core.

At 1240, a second phone state is stored on a second core. In particular, the second phone state is stored on a local cache of the second core. Further, the second phone state is a phone state of the progression of phone states. The second phone state is also associated with a position within the progression of phone states. The position associated with the first phone state differs from the position associated with the second phone state. Further, the content of the first phone state may differ from the content of the second phone state. Alternatively, the content of the first phone state may match the content of the second phone state.

At 1250, the first set of cells is provided to the first core. In particular, each cell of the first set of cells has a phone state that matches the first phone state.

At 1260, the second set of cells is provided to the second core. In particular, each cell of the second set of cells has a phone state that matches the second phone state.

At 1270, matching scores of the cells of the first set of cells are calculated. In particular, the matching scores of the cells of the first set are cells are calculated on the first core. The matching scores of each cell of the first set of cells may be calculated simultaneously.

At 1280, matching scores of the cells of the second set of cells are calculated. In particular, the matching scores of the cells of the second set are cells are calculated on the second core. The matching scores of each cell of the second set of cells may be calculated simultaneously. Further, the matching scores of each cell of the first set of cells and each cell of the second set of cells may be calculated simultaneously.

Figure 13:
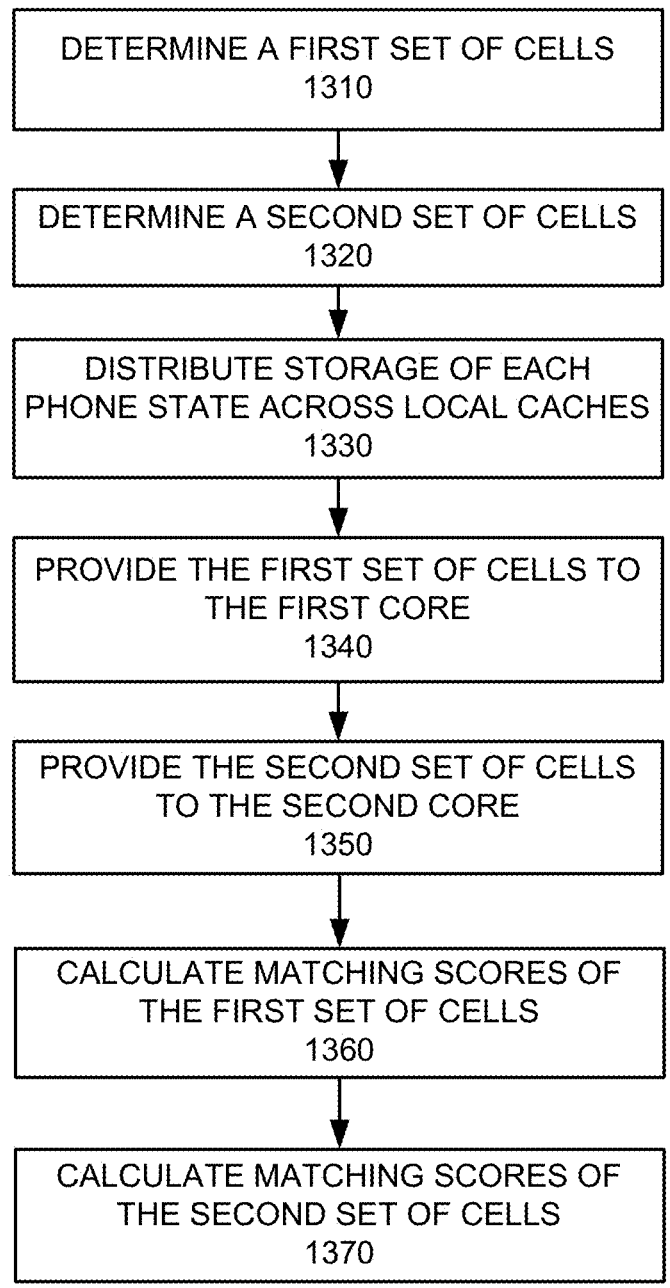
FIG. 13 illustrates a second flow chart of a method of optimizing the calculation of matching scores between phone states and acoustic frames across a matrix of an expected progression of phone states aligned with an observed progression of acoustic frames within an utterance, in accordance with embodiments of the present invention.

FIG. 13 illustrates a second flow chart of a method of optimizing the calculation of matching scores between phone states and acoustic frames across a matrix of an expected progression of phone states aligned with an observed progression of acoustic frames within an utterance, in accordance with embodiments of the present invention. In particular, the matrix includes a plurality of cells. Each cell of the plurality of cells is associated with a characteristic acoustic frame. In particular, each acoustic frame is a portion of the utterance. An utterance comprises a segment of speech. Additionally, a duration of each acoustic frame may be the same for each cell. Further, each cell of the plurality of cells is also associated with a characteristic phone state. In particular, each phone state is a phone state of the progression of phone states. Additionally, each phone state is associated with a position within the progression of phone states.

At 1310, a first set of cells is determined. In particular, the first set of cells is within a first row. Further, the first row is associated with a first phone state of the progression of phone states. Additionally, each cell of the first set of cells has a high probability of matching the first phone state.

At 1320, a second set of cells is determined. In particular, the second set of cells is within a second row. Further, the second row is associated with a second phone state of the progression of phone states. Additionally, each cell of the second set of cells has a high probability of matching the second phone state.

At 1330, storage of each phone state is distributed across local caches. In particular, each phone state of the progression of phone states is distributed across a plurality of local caches on a chip. In one example, each phone state may be distributed to a local cache based on an amount of storage space available on the local cache. In particular, under the example, each phone state may be distributed to the local cache having the greatest amount of available space at the time the phone state is distributed. In a further example, each phone state may be distributed to a local cache based on the speed of the local cache. In particular, under the further example, each phone state may be distributed to the local cache having the greatest amount of available speed at the time the phone state is distributed.

At 1340, the first set of cells is provided to the first core. In particular, each cell of the first set of cells has a phone state that matches the first phone state.

At 1350, the second set of cells is provided to the second core. In particular, each cell of the second set of cells has a phone state that matches the second phone state.

At 1360, matching scores of the cells of the first set of cells are calculated. In particular, the matching scores of the cells of the first set are cells are calculated on the first core. The matching scores of each cell of the first set of cells may be calculated simultaneously.

At 1370, matching scores of the cells of the second set of cells are calculated. In particular, the matching scores of the cells of the second set are cells are calculated on the second core. The matching scores of each cell of the second set of cells may be calculated simultaneously. Further, the matching scores of each cell of the first set of cells and each cell of the second set of cells may be calculated simultaneously.

Figure 14:
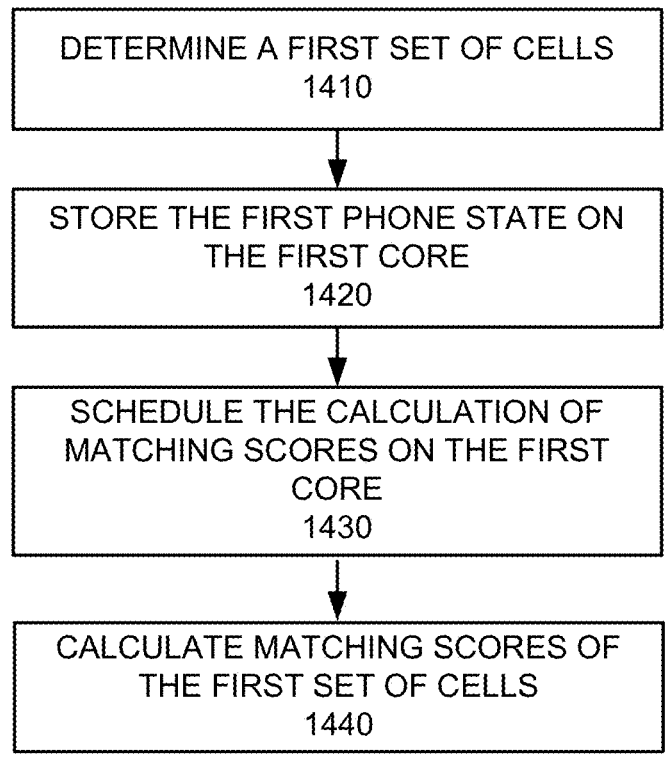
FIG. 14 illustrates a third flow chart of a method of optimizing the calculation of matching scores between phone states and acoustic frames across a matrix of an expected progression of phone states aligned with an observed progression of acoustic frames within an utterance, in accordance with embodiments of the present invention.

FIG. 14 illustrates a third flow chart of a method of optimizing the calculation of matching scores between phone states and acoustic frames across a matrix of an expected progression of phone states aligned with an observed progression of acoustic frames within an utterance, in accordance with embodiments of the present invention. In particular, the matrix includes a plurality of cells. Each cell of the plurality of cells is associated with a characteristic acoustic frame. In particular, each acoustic frame is a portion of the utterance. An utterance comprises a segment of speech. Additionally, a duration of each acoustic frame may be the same for each cell. Further, each cell of the plurality of cells is also associated with a characteristic phone state. In particular, each phone state is a phone state of the progression of phone states. Additionally, each phone state is associated with a position within the progression of phone states.

The plurality of cells also comprises at least one anchor point. In particular, a first anchor point may comprise a cell associated with a first phone state of the progression of phone states, where the cell is further associated with a first acoustic frame of the progression of acoustic frames. Further, a second anchor point may comprise a cell associated with a last phone state of the progression of phone states, where the cell is further associated with a last acoustic frame of the progression of acoustic frames.

At 1410, a first set of cells is determined. In particular, the first set of cells is within a first row. Further, the first row is associated with a first phone state of the progression of phone states. Additionally, each cell of the first set of cells has a high probability of matching the first phone state.

At 1420, a first phone stated is stored on a first core. In particular, the first phone state may be stored on a local cache of the first core. Further, the first phone state is a phone state of the progression of phone states. The first phone state is also associated with a position within the progression of phone states. Additionally, a plurality of phone states may be stored on the local cache of the first core. For example, another phone state may be stored on the local cache of the first core along with the first phone state that is stored on the local cache of the first core.

At 1430, the calculation of matching scores of cells on the first core is scheduled. In particular, the calculation of matching scores is scheduled for each cell of the first set of cells on the first core. Further, each cell of the first set of cells is associated with the first phone state.

At 1440, the matching scores of the cells are calculated. In particular, the matching scores of the cells are calculated on the first core. Further, the cells are cell of the first set of cells. The matching scores of each cell of the first set of cells may be calculated simultaneously.

In a further embodiment, the calculation of matching scores of a second set of cells may be scheduled on the first core. In particular, each cell of the second set of cells may be associated with the first phone state. Further, the matching scores of the second set of cells may be calculated on the first core.

Figure 15:
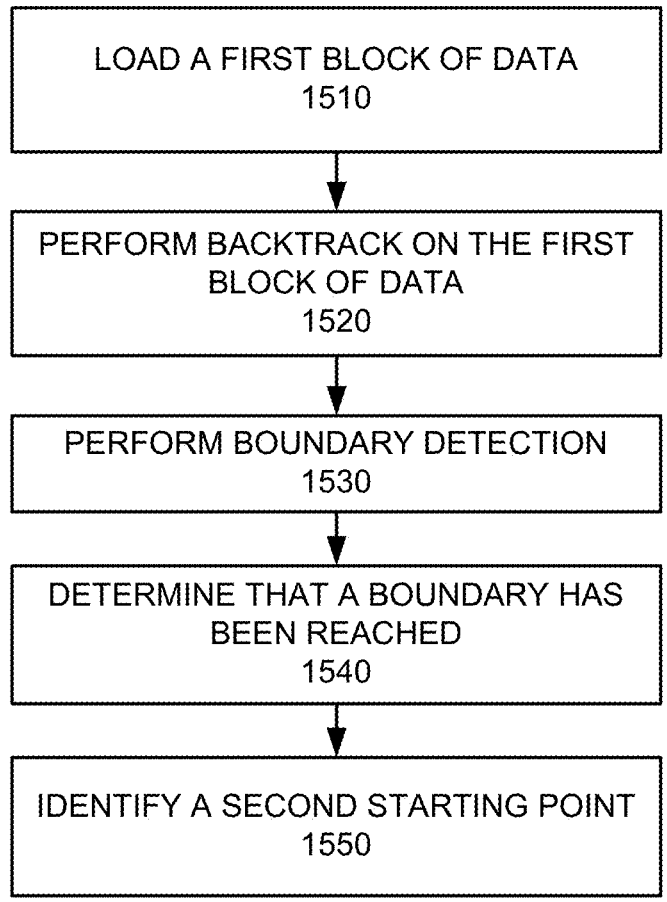
FIG. 15 illustrates a flow chart of a method of determining a path across a matrix comprising a plurality of cells, each cell having a characteristic phone state and a characteristic acoustic frame, where the path demonstrates a best alignment of an expected progression of phone states that are derived from a transcript and an observed progression of acoustic frames within an utterance, in accordance with embodiments of the present invention.

In one embodiment, FIG. 15 illustrates a flow chart of method of determining a path across a matrix comprising a plurality of cells, each cell having a characteristic phone state and a characteristic acoustic frame, where the path demonstrates a best alignment of an expected progression of phone states that are derived from a transcript and an observed progression of acoustic frames within an utterance, in accordance with embodiments of the present invention. In particular, each acoustic frame is a portion of the utterance. An utterance comprises a segment of speech. Additionally, a duration of each acoustic frame may be the same for each cell.

At 1510, a first block of data is loaded. In particular, the first block of data is loaded based on a first starting point. The first starting point may comprise a cell associated with a last phone state of the progression of phone states, and the cell is further associated with a last acoustic frame of the progression of acoustic frames.

At 1520, backtrack is performed on the first block of data. In particular, the first block of data is loaded based on a first starting point. The first starting point may comprise a cell associated with a last phone state of the progression of phone states, and the cell is further associated with a last acoustic frame of the progression of acoustic frames. The first block of data may comprise the first staring point. The first block of data may also be retrieved from an off-site storage cache. Additionally, the first block of data may be stored on a local cache of a core on a chip. Further, the backtrack may be performed on the core. Accordingly, the entire first block of data may be pre-fetched and loaded on to the local cache prior to performing the backtrack.

Performing backtrack may comprise determining a locally optimal solution that is associated with each phone state. Additionally, performing backtrack may comprise determining the best path that demonstrates a best alignment of the expected progression of phone states and the observed progression of acoustic frames within an utterance. Further, the best path may comprise the locally optimal solutions associated with each phone state of the progression of phone states.

At 1530, boundary detection is performed. In particular, boundary detection is performed to determine if a next cell is within the bound of the local data.

At 1540, a determination is made that a boundary has been reached.

At 1550, a second starting point is identified. In particular, the second starting point is used for loading a second block of data. The second block of data may comprise the second starting point. The second block of data may also comprise a next sequential block of data. Alternatively, the second block of data may include some overlap between the first block of data and a next sequential block of data. As such, the first block of data may also comprise the second starting point. Further, the sequential nature of blocks may be determined based on the direction of the backtrack. For example, a next sequential block of data may include cells that are nearer to, or that include, an anchoring cell within the matrix, wherein the anchoring cell comprises a cell associated with a first phone state of the progression of phone states, and the cell is further associated with a first acoustic frame of the progression of acoustic frames.

In another embodiment, FIG. 15 illustrates a flow chart of method of determining a path across a matrix comprising a plurality of cells, each cell having a characteristic state and a characteristic observation, where the path demonstrates a best alignment of an expected progression of states that are derived from a transcript and an observed progression of observations, in accordance with embodiments of the present invention. Additionally, a duration of each observation may be the same for each cell.

At 1510, a first block of data is loaded. In particular, the first block of data is loaded based on a first starting point. The first starting point may comprise a cell associated with a last state of the progression of states, and the cell is further associated with a last observation of the progression of observations.

At 1520, backtrack is performed on the first block of data. In particular, the first block of data is loaded based on a first starting point. The first starting point may comprise a cell associated with a last state of the progression of states, and the cell is further associated with a last observation of the progression of observations. The first block of data may comprise the first staring point. The first block of data may also be retrieved from an off-site storage cache. Additionally, the first block of data may be stored on a local cache of a core on a chip. Further, the backtrack may be performed on the core.

Accordingly, the entire first block of data may be pre-fetched and loaded on to the local cache prior to performing the backtrack.

Performing backtrack may comprise determining a locally optimal solution that is associated with each state. Additionally, performing backtrack may comprise determining the best path that demonstrates a best alignment of the expected progression of states and the observed progression of observations within an utterance. Further, the best path may comprise the locally optimal solutions associated with each state of the progression of states.

At 1530, boundary detection is performed. In particular, boundary detection is performed to determine if a next cell is within the bound of the local data.

At 1540, a determination is made that a boundary has been reached.

At 1550, a second starting point is identified. In particular, the second starting point is used for loading a second block of data. The second block of data may comprise the second starting point. The second block of data may also comprise a next sequential block of data. Alternatively, the second block of data may include some overlap between the first block of data and a next sequential block of data. As such, the first block of data may also comprise the second starting point. Further, the sequential nature of blocks may be determined based on the direction of the backtrack. For example, a next sequential block of data may include cells that are nearer to, or that include, an anchoring cell within the matrix, wherein the anchoring cell comprises a cell associated with a first state of the progression of states, and the cell is further associated with a first observation of the progression of observations.

Figure 16:
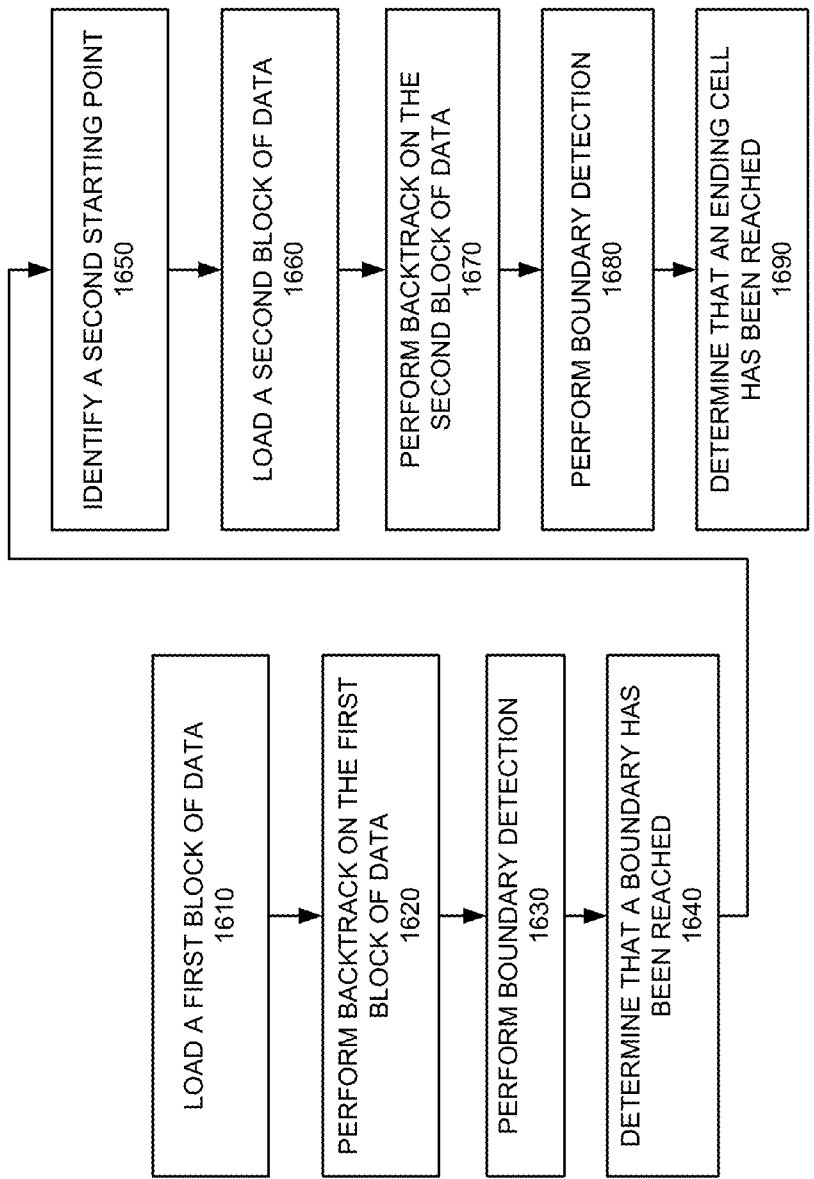
FIG. 16 illustrates another flow chart of a method of determining a path across a matrix comprising a plurality of cells, each cell having a characteristic phone state and a characteristic acoustic frame, where the path demonstrates a best alignment of an expected progression of phone states that are derived from a transcript and an observed progression of acoustic frames within an utterance, in accordance with embodiments of the present invention.

In one embodiment, FIG. 16 illustrates a flow chart of a method of determining a path across a matrix comprising a plurality of cells, each cell having a characteristic phone state and a characteristic acoustic frame, where the path demonstrates a best alignment of an expected progression of phone states and an observed progression of acoustic frames within an utterance, in accordance with embodiments of the present invention. In particular, each acoustic frame is a portion of a hand-written signature. Additionally, a length of each acoustic frame may be the same for each cell.

At 1610, a first block of data is loaded. In particular, the first block of data is loaded based on a first starting point. In particular, the first starting point may comprise a cell associated with a last phone state of the progression of phone states, and the cell is further associated with a last observance of the progression of observances. Alternatively, the first starting point may comprise a cell associated with a phone state that is between the first phone state and the last phone state of the progression of phone states, and the cell is further associated with an observance that is between the first observance and the last observance of the progression of observances.

The first block of data may comprise the first staring point. The first block of data may also be retrieved from an off-site storage cache. Additionally, the first block of data may be stored on a local cache of a core on a chip. Further, the backtrack may be performed on the core. Accordingly, the entire first block of data may be pre-fetched and loaded on to the local cache prior to performing the backtrack.

At 1620, backtrack is performed on the first block of data. Performing backtrack may comprise determining a locally optimal solution that is associated with each phone state. Additionally, performing backtrack may comprise determining the best path that demonstrates a best alignment of the expected progression of phone states and the observed progression of observances. Further, the best path may comprise the locally optimal solutions associated with each phone state of the progression of phone states.

At 1630, boundary detection is performed. In particular, boundary detection may be used to determine whether a next cell to be analyzed is within the first block of data.

At 1640, a determination is made that a boundary has been reached.

At 1650, a second starting point is identified. In particular, the second starting point may comprise a cell associated with a phone state that is between the first phone state and the last phone state of the progression of phone states, and the cell is further associated with an observance that is between the first observance and the last observance of the progression of observances.

At 1660, a second block of data is loaded. The second block of data may comprise the second starting point. The second block of data may also comprise a next sequential block of data. Alternatively, the second block of data may include some overlap between the first block of data and a next sequential block of data. As such, the first block of data may also comprise the second starting point. Further, the sequential nature of blocks may be determined based on the direction of the backtrack. For example, a next sequential block of data may include cells that are nearer to, or that include, an anchoring cell within the matrix, wherein the anchoring cell comprises a cell associated with a first phone state of the progression of phone states, and the cell is further associated with a first observance of the progression of observances.

At 1670, backtrack is performed on the second block of data.

At 1680, boundary detection is performed. In particular, boundary detection may be used to determine whether a next cell to be analyzed is within the second block of data.

At 1690, a determination is made that an ending cell has been reached. In particular, the ending cell may comprise a cell associated with a first phone state of the progression of phone states, and the cell is further associated with a first observance of the progression of observances.

In another embodiment, FIG. 16 illustrates a flow chart of a method of determining a path across a matrix comprising a plurality of cells, each cell having a characteristic state and a characteristic observation, where the path demonstrates a best alignment of an expected progression of states and an observed progression of observations, in accordance with embodiments of the present invention. In particular, each observation is a portion of a hand-written signature. Additionally, a length of each observation may be the same for each cell.

At 1610, a first block of data is loaded. In particular, the first block of data is loaded based on a first starting point. In particular, the first starting point may comprise a cell associated with a last state of the progression of states, and the cell is further associated with a last observance of the progression of observances. Alternatively, the first starting point may comprise a cell associated with a state that is between the first state and the last state of the progression of states, and the cell is further associated with an observance that is between the first observance and the last observance of the progression of observances.

The first block of data may comprise the first staring point. The first block of data may also be retrieved from an off-site storage cache. Additionally, the first block of data may be stored on a local cache of a core on a chip. Further, the backtrack may be performed on the core. Accordingly, the entire first block of data may be pre-fetched and loaded on to the local cache prior to performing the backtrack.

At 1620, backtrack is performed on the first block of data. Performing backtrack may comprise determining a locally optimal solution that is associated with each state. Additionally, performing backtrack may comprise determining the best path that demonstrates a best alignment of the expected progression of states and the observed progression of observances. Further, the best path may comprise the locally optimal solutions associated with each state of the progression of states.

At 1630, boundary detection is performed. In particular, boundary detection may be used to determine whether a next cell to be analyzed is within the first block of data.

At 1640, a determination is made that a boundary has been reached.

At 1650, a second starting point is identified. In particular, the second starting point may comprise a cell associated with a state that is between the first state and the last state of the progression of states, and the cell is further associated with an observance that is between the first observance and the last observance of the progression of observances.

At 1660, a second block of data is loaded. The second block of data may comprise the second starting point. The second block of data may also comprise a next sequential block of data. Alternatively, the second block of data may include some overlap between the first block of data and a next sequential block of data. As such, the first block of data may also comprise the second starting point. Further, the sequential nature of blocks may be determined based on the direction of the backtrack. For example, a next sequential block of data may include cells that are nearer to, or that include, an anchoring cell within the matrix, wherein the anchoring cell comprises a cell associated with a first state of the progression of states, and the cell is further associated with a first observance of the progression of observances.

At 1670, backtrack is performed on the second block of data.

At 1680, boundary detection is performed. In particular, boundary detection may be used to determine whether a next cell to be analyzed is within the second block of data.

At 1690, a determination is made that an ending cell has been reached. In particular, the ending cell may comprise a cell associated with a first state of the progression of states, and the cell is further associated with a first observance of the progression of observances.

Figure 17:
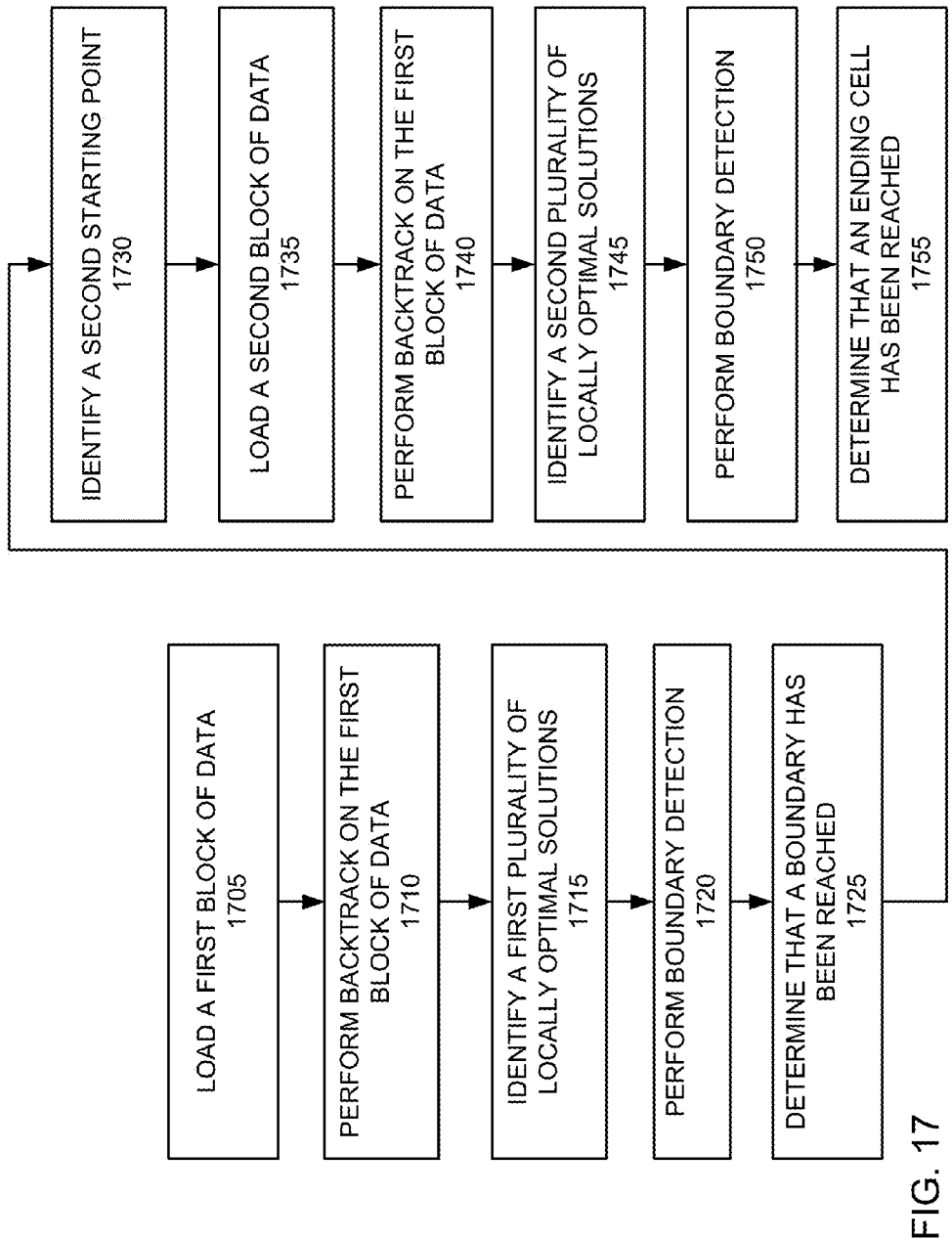
FIG. 17 illustrates a further flow chart of a method of determining a path across a matrix comprising a plurality of cells, each cell having a characteristic phone state and a characteristic acoustic frame, where the path demonstrates a best alignment of an expected progression of phone states that are derived from a transcript and an observed progression of acoustic frames within an utterance, in accordance with embodiments of the present invention.

In one embodiment, FIG. 17 illustrates another flow chart of method of determining a path across a matrix comprising a plurality of cells, each cell having a characteristic phone state and a characteristic acoustic frame, where the path demonstrates a best alignment of an expected progression of phone states that are derived from a transcript and an observed progression of acoustic frames within an utterance, in accordance with embodiments of the present invention. In particular, each acoustic frame is a portion of the utterance. An utterance comprises a segment of speech. Additionally, a duration of each acoustic frame may be the same for each cell.

At 1705, a first block of data is loaded. In particular, the first block of data is loaded based on a first starting point. In particular, the first starting point may comprise a cell associated with a last phone state of the progression of phone states, and the cell is further associated with a last acoustic frame of the progression of acoustic frames. Alternatively, the first starting point may comprise a cell associated with a phone state that is between the first phone state and the last phone state of the progression of phone states, and the cell is further associated with an acoustic frame that is between the first acoustic frame and the last acoustic frame of the progression of acoustic frames.

The first block of data may comprise the first staring point. The first block of data may also be retrieved from an off-site storage cache. Additionally, the first block of data may be stored on a local cache of a core on a chip. Further, the backtrack may be performed on the core. Accordingly, the entire first block of data may be pre-fetched and loaded on to the local cache prior to performing the backtrack.

At 1710, backtrack is performed on the first block of data. Performing backtrack may comprise determining a locally optimal solution that is associated with each phone state. Additionally, performing backtrack may comprise determining the best path that demonstrates a best alignment of the expected progression of phone states and the observed progression of acoustic frames within an utterance. Further, the best path may comprise the locally optimal solutions associated with each phone state of the progression of phone states. In particular, the best path may comprise the first plurality of locally optimal solutions within the first block of data and the second plurality of locally optimal solutions within the second block of data.

At 1715, a first plurality of locally optimal solutions are identified. In particular, each locally optimal solution may be associated with one phase state. Additionally and/or alternatively, each phase state may be associated with one locally optimal solution.

At 1720, boundary detection is performed. In particular, boundary detection may be used to determine whether a next cell to be analyzed is within the first block of data.

At 1725, a determination is made that a boundary has been reached.

At 1730, a second starting point is identified. In particular, the second starting point may comprise a cell associated with a phone state that is between the first phone state and the last phone state of the progression of phone states, and the cell is further associated with an acoustic frame that is between the first acoustic frame and the last acoustic frame of the progression of acoustic frames.

At 1735, a second block of data is loaded. The second block of data may comprise the second starting point. The second block of data may also comprise a next sequential block of data. Alternatively, the second block of data may include some overlap between the first block of data and a next sequential block of data. As such, the first block of data may also comprise the second starting point. Further, the sequential nature of blocks may be determined based on the direction of the backtrack. For example, a next sequential block of data may include cells that are nearer to, or that include, an anchoring cell within the matrix, wherein the anchoring cell comprises a cell associated with a first phone state of the progression of phone states, and the cell is further associated with a first acoustic frame of the progression of acoustic frames.

At 1740, backtrack is performed on the second block of data.

At 1745, a second plurality of locally optimal solutions are identified. As discussed above, performing backtrack may comprise determining the best path that demonstrates a best alignment of the expected progression of phone states and the observed progression of acoustic frames within an utterance. In particular, the best path may comprise the first plurality of locally optimal solutions within the first block of data and the second plurality of locally optimal solutions within the second block of data.

At 1750, boundary detection is performed. In particular, boundary detection may be used to determine whether a next cell to be analyzed is within the second block of data.

At 1755, a determination is made that an ending cell has been reached. In particular, the ending cell may comprise a cell associated with a first phone state of the progression of phone states, and the cell is further associated with a first acoustic frame of the progression of acoustic frames.

In another embodiment, FIG. 17 illustrates another flow chart of method of determining a path across a matrix comprising a plurality of cells, each cell having a characteristic state and a characteristic observation, where the path demonstrates a best alignment of an expected progression of states that are derived from a transcript and an observed progression of observations within an utterance, in accordance with embodiments of the present invention. In particular, each observation is a portion of the utterance. An utterance comprises a segment of speech. Additionally, a duration of each observation may be the same for each cell.

At 1705, a first block of data is loaded. In particular, the first block of data is loaded based on a first starting point. In particular, the first starting point may comprise a cell associated with a last state of the progression of states, and the cell is further associated with a last observation of the progression of observations. Alternatively, the first starting point may comprise a cell associated with a state that is between the first state and the last state of the progression of states, and the cell is further associated with an observation that is between the first observation and the last observation of the progression of observations.

The first block of data may comprise the first staring point. The first block of data may also be retrieved from an off-site storage cache. Additionally, the first block of data may be stored on a local cache of a core on a chip. Further, the backtrack may be performed on the core. Accordingly, the entire first block of data may be pre-fetched and loaded on to the local cache prior to performing the backtrack.

At 1710, backtrack is performed on the first block of data. Performing backtrack may comprise determining a locally optimal solution that is associated with each state. Additionally, performing backtrack may comprise determining the best path that demonstrates a best alignment of the expected progression of states and the observed progression of observations within an utterance. Further, the best path may comprise the locally optimal solutions associated with each state of the progression of states. In particular, the best path may comprise the first plurality of locally optimal solutions within the first block of data and the second plurality of locally optimal solutions within the second block of data.

At 1715, a first plurality of locally optimal solutions are identified. In particular, each locally optimal solution may be associated with one phase state. Additionally and/or alternatively, each phase state may be associated with one locally optimal solution.

At 1720, boundary detection is performed. In particular, boundary detection may be used to determine whether a next cell to be analyzed is within the first block of data.

At 1725, a determination is made that a boundary has been reached.

At 1730, a second starting point is identified. In particular, the second starting point may comprise a cell associated with a state that is between the first state and the last state of the progression of states, and the cell is further associated with an observation that is between the first observation and the last observation of the progression of observations.

At 1735, a second block of data is loaded. The second block of data may comprise the second starting point. The second block of data may also comprise a next sequential block of data. Alternatively, the second block of data may include some overlap between the first block of data and a next sequential block of data. As such, the first block of data may also comprise the second starting point. Further, the sequential nature of blocks may be determined based on the direction of the backtrack. For example, a next sequential block of data may include cells that are nearer to, or that include, an anchoring cell within the matrix, wherein the anchoring cell comprises a cell associated with a first state of the progression of states, and the cell is further associated with a first observation of the progression of observations.

At 1740, backtrack is performed on the second block of data.

At 1745, a second plurality of locally optimal solutions are identified. As discussed above, performing backtrack may comprise determining the best path that demonstrates a best alignment of the expected progression of states and the observed progression of observations within an utterance. In particular, the best path may comprise the first plurality of locally optimal solutions within the first block of data and the second plurality of locally optimal solutions within the second block of data.

At 1750, boundary detection is performed. In particular, boundary detection may be used to determine whether a next cell to be analyzed is within the second block of data.

At 1755, a determination is made that an ending cell has been reached. In particular, the ending cell may comprise a cell associated with a first state of the progression of states, and the cell is further associated with a first observation of the progression of observations.

Figure 18:
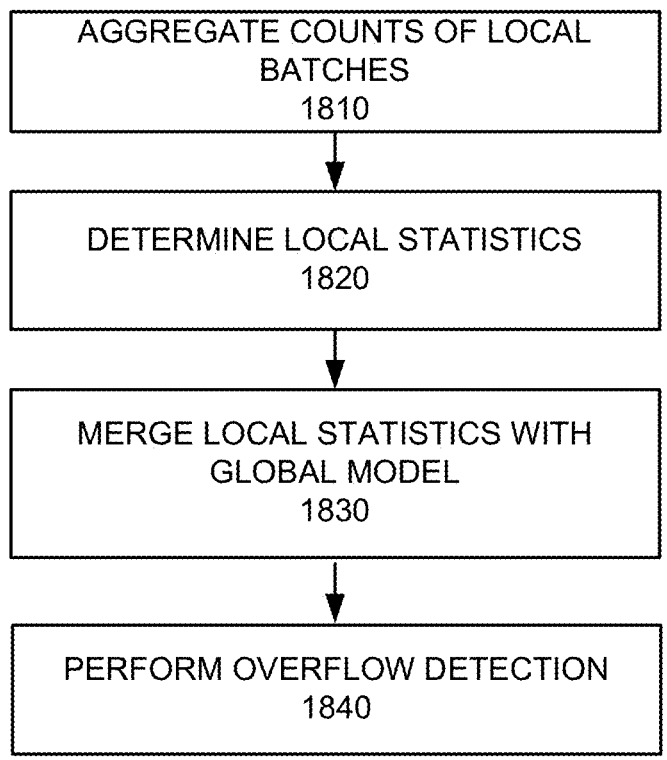
FIG. 18 illustrates a method of accounting for utterances across phone states, in accordance with embodiments of the present invention.

FIG. 18 illustrates a method of accounting for utterances across phone states, in accordance with embodiments of the present invention. In particular, at 1810, counts of a set of local batches are aggregated. At 1820, local statistics are determined. At 1830, the local statistics are merged into a global model. At 1840, overflow detection is performed. In particular, the overflow protection is performed during the merging of the local statistics into the global model.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method of optimizing the calculation of matching scores between phone states and acoustic frames across a matrix of a known, ordered progression of phone states of a transcript of at least one word aligned with an observed progression of acoustic frames within an utterance of the at least one word, the matrix having a plurality of cells, each cell associated with a characteristic acoustic frame and a characteristic phone state, the method comprising:

determining a first set of cells within a first row, the first row associated with a first phone state of the known, ordered progression of phone states of the transcript of the at least one word, wherein each cell of the first set of cells meets a threshold probability of matching the first phone state;

determining a second set of cells within a second row, the second row associated with a second phone state of the known, ordered progression of phone states of the transcript of the at least one word, wherein each cell of the second set of cells meets a threshold probability of matching the second phone state;

storing, on a local cache of a first core, the first phone state;

storing, on a local cache of a second core, the second phone state;

providing, to the first core, the first set of cells;

providing, to the second core, the second set of cells;

calculating, on the first core, matching scores of each characteristic state and characteristic observation of each cell of the first set of cells; and calculating, on the second core, matching scores of each characteristic state and characteristic observation of each cell of the second set of cells, wherein the matching scores of the cells of the first set of cells and the matching scores of the cells of the second set of cells are calculated simultaneously.

2. The method of claim 1, wherein each acoustic frame is a portion of the utterance.

3. The method of claim 1, wherein a duration of each acoustic frame is the same for each cell.

4. The method of claim 1, wherein each phone state is associated with a position within the progression of phone states.

5. The method of claim 4, wherein the first phone state has a position that differs from the position of the second phone state.

6. The method of claim 5, wherein the content of the first phone state matches the content of the second phone state.

7. The method of claim 1, wherein the transcript of the at least one word comprises a plurality of words.

8. A method of optimizing the calculation of matching scores between phone states and acoustic frames across a matrix of a known, ordered progression of phone states of a transcript of at least one word aligned with an observed progression of acoustic frames within an utterance of the at least one word, the matrix having a plurality of cells, each cell associated with a characteristic acoustic frame and a characteristic phone state, the method comprising:

determining a first set of cells within a first row, the first row associated with a first phone state of the known, ordered progression of phone states of the transcript of the at least one word, wherein each cell of the first set of cells meets a threshold probability of matching the first phone state;

determining a second set of cells within a second row, the second row associated with a second phone state of the known, ordered progression of phone states of the transcript of the at least one word, wherein each cell of the second set of cells meets a threshold probability of matching the second phone state;

distributing storage of each phone state of the progression of phone states across a plurality of local caches on a chip;

providing, to a first core, the first set of cells associated with a first phone state that matches the phone state that is stored on the local cache that is associated with the first core;

providing, to a second core, the second set of cells associated with a second phone state that matches the phone state that is stored on the local cache that is associated with the second core;

calculating, on the first core, matching scores of each characteristic state and characteristic observation of each cell of the first set of cells; and calculating, on the second core, matching scores of each characteristic state and characteristic observation of each cell of the second set of cells, wherein the matching scores of the cells of the first set of cells and the matching scores of the cells of the second set of cells are calculated simultaneously.

9. The method of claim 8, wherein each phone state is distributed to a local cache based on an amount of storage space available on the local cache.

10. The method of claim 9, wherein each phone state is distributed to the local cache having the greatest amount of available space at the time the phone state is distributed.

11. The method of claim 8, wherein a plurality of phone states are stored on a local cache.

12. The method of claim 8, wherein the transcript of the at least one word comprises a plurality of words.

13. A method of optimizing the calculation of matching scores between phone states and acoustic frames across a matrix of a known, ordered progression of phone states of a transcript of at least one word aligned with an observed progression of acoustic frames within an utterance of the at least one word, the matrix having a plurality of cells, each cell associated with a characteristic acoustic frame and a characteristic phone state, the method comprising:

determining a first set of cells within a first row, the first row associated with a first phone state of the known, ordered progression of phone states of the transcript of the at least one word, wherein each cell of the first set of cells meets a threshold probability of matching the first phone state;

storing, on a first core, a first phone state of the progression of phone states;

scheduling the calculation of matching scores of each cell of a first set of cells on the first core, where each cell of the first set of cells is associated with the first phone state;

calculating, on the first core, matching scores of each characteristic state and characteristic observation of each cell of the first set of cells, wherein the matching scores of the cells of the first set of cells are calculated simultaneously.

14. The method of claim 13, wherein the first phone state is stored on a local cache of the first core.

15. The method of claim 13, further comprising:

determining a second set of cells within a second row, the second row associated with a second phone state of the progression of phone states, wherein each cell of the second set of cells has a high probability of matching the second phone state;

scheduling the calculation of matching scores of each cell of a second row of cells on the first core, where each cell of the second row of cells is associated with the first phone state;

calculating, on the first core, matching scores of each characteristic state and characteristic observation of each cell of the second row of cells.

16. The method of claim 13, wherein the plurality of cells comprise at least one anchor point.

17. The method of claim 16, wherein a first anchor point comprises a cell associated with a first phone state of the progression of phone states, and the cell is further associated with a first acoustic frame of the progression of acoustic frames.

18. The method of claim 17, wherein a second anchor point comprises a cell associated with a last phone state of the progression of phone states, and the cell is further associated with a last acoustic frame of the progression of acoustic frames.

19. The method of claim 13, wherein the transcript of the at least one word comprises a plurality of words.

* * * * *